United States Patent
Connors et al.

(10) Patent No.: US 7,426,481 B1
(45) Date of Patent: Sep. 16, 2008

(54) METHOD AND APPARATUS FOR SORTING PRODUCTS BY FEATURES

(75) Inventors: Christopher M. Connors, Austin, TX (US); Andrew F. Miller, Austin, TX (US); Joshua P. Walsky, Austin, TX (US); James Singh, Austin, TX (US); Andrew Leamon, Wayne, PA (US); Jeffrey R. VanDyke, Austin, TX (US)

(73) Assignee: Versata Development Group, Inc., Austin, TX (US)

( * ) Notice: Subject to any disclaimer, the term of this patent is extended or adjusted under 35 U.S.C. 154(b) by 573 days.

(21) Appl. No.: 09/770,694

(22) Filed: Jan. 26, 2001

Related U.S. Application Data

(63) Continuation-in-part of application No. 09/760,059, filed on Jan. 12, 2001, now abandoned.

(60) Provisional application No. 60/176,117, filed on Jan. 14, 2000.

(51) Int. Cl.
G06Q 30/00 (2006.01)
G06F 17/30 (2006.01)

(52) U.S. Cl. .......................................... 705/26; 705/27
(58) Field of Classification Search .................. 705/26, 705/27
See application file for complete search history.

(56) References Cited

U.S. PATENT DOCUMENTS

| | | | |
|---|---|---|---|
| 5,193,056 A | 3/1993 | Boes | 705/36 |
| 5,369,732 A | 11/1994 | Lynch et al. | 706/46 |
| 5,398,308 A | 3/1995 | Kato et al. | 715/500.1 |
| 5,493,490 A | 2/1996 | Johnson | 705/26 |
| 5,515,524 A | 5/1996 | Lynch et al. | 703/13 |
| 5,708,798 A | 1/1998 | Lynch et al. | 703/1 |

(Continued)

FOREIGN PATENT DOCUMENTS

CA 2153530 A1 * 1/1997

(Continued)

OTHER PUBLICATIONS

Anon., "Ford Finds That Viewdata Gives You More," Information Management, pp. 4-6, Feb. 1985.*

(Continued)

*Primary Examiner*—Nicholas D Rosen
(74) *Attorney, Agent, or Firm*—Hamilton & Terrile, LLP; Kent B. Chambers

(57) ABSTRACT

A computer system provides product selections to a user according to a needs analysis. A database stores pre-generated product configurations and product configuration information. The product configuration information includes product features and product rules governing allowable combinations of the product features. Received product related data can include different types of information such as attribute information and product identifier information. The received product related data is processed to determine the type of received information. If the type is attribute information, the received product related data is filtered in accordance with the product configuration information and one or more product configurations that meet requirements of the received attribute information is identified. If the type is product identifier information, one or more of the pre-generated product configurations that corresponds to the received product related data is identified. Each identified product configuration and each identified pre-generated product configuration is provided to the user.

73 Claims, 29 Drawing Sheets

U.S. PATENT DOCUMENTS

| | | | | |
|---|---|---|---|---|
| 5,710,887 | A | | 1/1998 | Chelliah et al. ............... 705/26 |
| 5,745,681 | A | | 4/1998 | Levine et al. ............... 709/200 |
| 5,754,850 | A | | 5/1998 | Janssen ................... 707/104.1 |
| 5,825,651 | A | | 10/1998 | Gupta et al. ................ 700/103 |
| 5,842,218 | A | | 11/1998 | Robinson ................... 707/102 |
| 5,844,554 | A | * | 12/1998 | Geller et al. ............... 345/744 |
| 5,907,320 | A | * | 5/1999 | Beesley et al. .......... 715/500.1 |
| 5,918,214 | A | | 6/1999 | Perkowski ................... 705/27 |
| 5,930,779 | A | | 7/1999 | Knoblock et al. .......... 705/412 |
| 5,937,390 | A | | 8/1999 | Hyodo ........................ 705/14 |
| 5,960,411 | A | | 9/1999 | Hartman et al. ............... 705/26 |
| 5,963,939 | A | * | 10/1999 | McCann et al. ................ 707/4 |
| 6,002,854 | A | | 12/1999 | Lynch et al. .................... 703/1 |
| 6,041,310 | A | | 3/2000 | Green et al. .................. 705/27 |
| 6,125,352 | A | * | 9/2000 | Franklin et al. ............... 705/26 |
| 6,282,517 | B1 | | 8/2001 | Wolfe et al. .................... 705/26 |
| 6,311,162 | B1 | | 10/2001 | Reichwein et al. ............. 705/1 |
| 6,339,763 | B1 | | 1/2002 | Divine et al. .................. 705/27 |
| 6,385,602 | B1 | | 5/2002 | Tso et al. ........................ 707/3 |
| 6,397,212 | B1 | | 5/2002 | Biffar ............................ 707/5 |
| 6,405,308 | B1 | | 6/2002 | Gupta et al. .................... 713/1 |
| 6,604,093 | B1 | * | 8/2003 | Etzion et al. .................. 706/47 |
| 6,606,744 | B1 | * | 8/2003 | Mikurak ..................... 717/174 |
| 6,609,108 | B1 | | 8/2003 | Pulliam et al. ................ 705/27 |
| 6,654,726 | B1 | | 11/2003 | Hanzek ........................ 705/26 |
| 6,675,294 | B1 | | 1/2004 | Gupta et al. ................... 713/1 |
| 6,728,685 | B1 | | 4/2004 | Ahluwalia ................... 705/26 |
| 6,865,524 | B1 | * | 3/2005 | Shah et al. ..................... 703/13 |
| 6,895,388 | B1 | * | 5/2005 | Smith .......................... 705/26 |
| 6,901,430 | B1 | * | 5/2005 | Smith ......................... 709/206 |
| 6,957,186 | B1 | * | 10/2005 | Guheen et al. ................. 705/1 |
| 7,003,548 | B1 | * | 2/2006 | Barck et al. ................. 709/203 |
| 7,197,479 | B1 | * | 3/2007 | Franciscus de Heer et al. ............................ 705/27 |
| 2002/0032626 | A1 | | 3/2002 | DeWolf et al. ................ 705/35 |
| 2005/0102199 | A1 | * | 5/2005 | Lee .............................. 705/27 |

FOREIGN PATENT DOCUMENTS

EP        1001355 A2 *  5/2000

OTHER PUBLICATIONS

O Leary, M., "CompuServe Is 'Loaded' with Online Car Info," Online, vol. 19, No. 6, pp. 70-71, Nov./Dec. 1995.*
Microsoft Press Computer Dictionary, Third Edition, Microsoft Press, Redmond, 1997, pp. 194 and 459.*
Anon., "Calico guides Online Car Buyers Direct to European Dealers," M2 Presswire, Nov. 5, 1999.*
Anon., "Concentra Releases Software for Automating Sales Product Configuration," Aviation Daily, vol. 321, No. 11, p. 92, Jul. 19, 1995.*
Neuborne, E., et al., "Branding on the Net: The Old Rules Don't Apply. So How Do You Hustle Those Wares Online?" Business Week, No. 3603, p. 76, Nov. 9, 1998.*
Autobytel.com screen shots from www.archive.org archived on Oct. 19, 1996.
Press release dated Sep. 30, 1996, "No-Hassle, No-Haggle Car Buying on the Internet," extracted from Autobytel.com on Jul. 9, 2003.
Press release dated Feb. 7, 1999, "Autobytel.com Inc. to launch online wholesale auction program," extracted from Autobytel.com on Jul. 9, 2003.
Press release dated Feb. 10, 1996, "Autobytel.com teams with Microsoft carsource to offer one-stop online car shopping," extracted from Autobytel.com on Jul. 9, 2003.
Little, Meredith, Buying and selling a car online, Real world Mac, Sep. 1999, 13 pages.
eSurvey, Auto sales online, Internet & electronic commerce strategies, May 1999, 3 pages.
Business Wire, Autoweb.com corporate profile, 1999 Piper Jaffray conference, 2 pages.
Autoconnect.com, http://web.archive.org/web/19981212012714/ http://autoconnect.com/, dated Dec. 12, 1998.
Priority U.S. Appl. No. 09/760,059, filed Jan. 12, 2001, Non-Final Office Action mailed Jul. 14, 2003.
Priority U.S. Appl. No. 09/760,059, filed Jan. 12, 2001, Response filed Dec. 18, 2003.
Priority U.S. Appl. No. 09/760,059, filed Jan. 12, 2001, Final Office Action mailed Feb. 5, 2004.
Priority U.S. Appl. No. 09/760,059, filed Jan. 12, 2001, Response filed Jul. 12, 2004.
Priority U.S. Appl. No. 09/760,059, filed Jan. 12, 2001, Advisory Action mailed Jul. 23, 2004.
Priority U.S. Appl. No. 09/760,059, filed Jan. 12, 2001, Request for Continued Examination mailed Aug. 10, 2004.
Priority U.S. Appl. No. 09/760,059, filed Jan. 12, 2001, Restriction Requirement mailed Oct. 18, 2004.
Priority U.S. Appl. No. 09/760,059, filed Jan. 12, 2001, Response to Restriction filed Nov. 17, 2004.
Priority U.S. Appl. No. 09/760,059, filed Jan. 12, 2001, Non-Final Office Action mailed Jan. 21, 2005.
Priority U.S. Appl. No. 09/760,059, filed Jan. 12, 2001, Response filed Jul. 25, 2005.
Priority U.S. Appl. No. 09/760,059, filed Jan. 12, 2001, Final Office Action mailed Oct. 18, 2005.
Priority U.S. Appl. No. 09/760,059, filed Jan. 12, 2001, Response filed Feb. 27, 2006.
Priority U.S. Appl. No. 09/760,059, filed Jan. 12, 2001, Advisory Action mailed Mar. 6, 2006.
Priority U.S. Appl. No. 09/760,059, filed Jan. 12, 2001, Request for Continued Examination mailed Mar. 24, 2006.
Priority U.S. Appl. No. 09/760,059, filed Jan. 12, 2001, Non-Final Office Action mailed Jun. 15, 2006.
Priority U.S. Appl. No. 09/760,059, filed Jan. 12, 2001, Response filed Nov. 15, 2006.
Priority U.S. Appl. No. 09/760,059, filed Jan. 12, 2001, Final Office Action mailed Feb. 5, 2007.
Priority U.S. Appl. No. 09/760,059, filed Jan. 12, 2001, Notice of Abandonment mailed Aug. 27, 2008.
Related U.S. Appl. No. 09/770,137, filed Jan. 26, 2001, Restriction Requirement mailed Jun. 17, 2003.
Related U.S. Appl. No. 09/770,137, filed Jan. 26, 2001, Notice of Abandonment mailed Jan. 27, 2004.
Related U.S. Appl. No. 09/770,137, filed Jan. 26, 2001, Petition to Revive filed Mar. 22, 2007.
Related U.S. Appl. No. 09/770,137, filed Jan. 26, 2001, Notice of Rescinded Abandonment mailed Mar, 22, 2007.
Related U.S. Appl. No. 09/770,137, filed Jan. 26, 2001, Response to Restriction filed Sep. 22, 2003.
Related U.S. Appl. No. 09/770,137, filed Jan. 26, 2001, Non-Final Office Action mailed Aug. 23, 2007.
Related U.S. Appl. No. 09/770,137, filed Jan. 26, 2001, Response filed Feb. 25, 2008.
Related U.S. Patent No. 7,130,821, issued Oct. 31, 2006, Non-Final Office Action mailed Mar. 3, 2004.
Related U.S. Patent No. 7,130,821, issued Oct. 31, 2006, Response filed Aug. 9, 2004.
Related U.S. Patent No. 7,130,821, issued Oct. 31, 2006, Restriction Requirement mailed Nov. 3, 2004.
Related U.S. Patent No. 7,130,821, issued Oct. 31, 2006, Response to Restriction Requirement filed Dec. 3, 2004.
Related U.S. Patent No. 7,130,821, issued Oct. 31, 2006, Final Office Action mailed Feb. 16, 2005.
Related U.S. Patent No. 7,130,821, issued Oct. 31, 2006, Notice of Appeal and Pre-Brief Conference Request filed Aug. 18, 2005.
Related U.S. Patent No. 7,130,821, issued Oct. 31, 2006, Pre-Appeal Conference Decision mailed Sep. 7, 2005.
Related U.S. Patent No. 7,130,821, issued Oct. 31, 2006, Request for Continued Examination filed Feb. 27, 2006.
Related U.S. Patent No. 7,130,821, issued Oct. 31, 2006, Preliminary Amendment filed May 21, 2001.
Related U.S. Patent No. 7,130,821, issued Oct. 31, 2006, Request for Refund Mar. 23, 2006.
Related U.S. Patent No. 7,130,821, issued Oct. 31, 2006, Amendment and Examiner Interview Summary mailed Jun. 21, 2006.
Related U.S. Patent No. 7,130,821, issued Oct. 31, 2006, Notice of Allowance mailed Jun. 26, 2006.

* cited by examiner

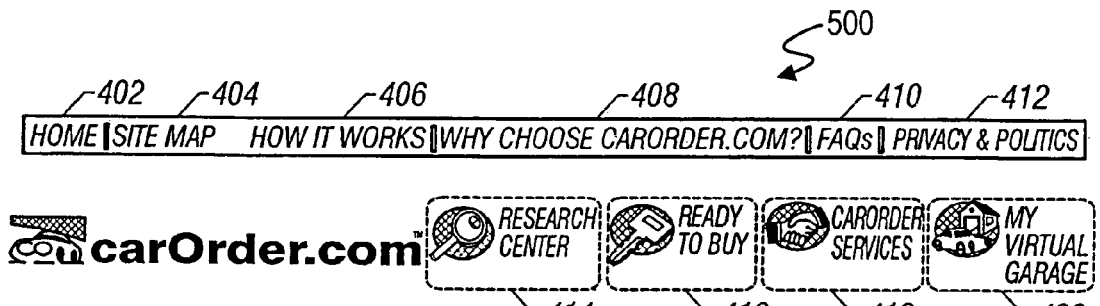

 User Profile: Create a New carOrder.com Account
PLEASE COMPLETE THE FIELDS BELOW TO OBTAIN A CARORDER.COM ACCOUNT.
BY LOGGING INTO YOUR ACCOUNT YOU CAN ACCESS CONFIGURATIONS
THAT YOU HAVE SAVED.

Required Account Information
PLEASE FILL OUT THESE FIELDS TO CREATE YOUR CARORDER.COM ACCOUNT. YOU MAY ALSO
COMPLETE THE OPTIONAL ACCOUNT INFORMATION (BELOW), BUT ONLY THE ITEMS MARKED
WITH THE RED ASTERISK (*) ARE REQUIRED TO CREATE YOUR ACCOUNT.

*Please enter your First Name:*  *   [ 502 ]

*Please enter your Last Name:*  *   [ 504 ]

*Please enter a unique name to identify yourself:*  *   [ 506 ]
THIS IS THE "USER NAME" YOU WILL USE TO LOG INTO YOUR CARORDER.COM
ACCOUNT WHEN YOU RETURN.

*Please enter a 5 to 10 character password:*  *   [ 508 ]
SELECT A PASSWORD THAT YOU WILL REMEMBER; YOU'LL NEED IT TO LOG INTO
YOUR CARORDER.COM ACCOUNT WHEN YOU RETURN

*Please re-enter your password for verification:*  *   [ 510 ]

*Please enter a valid email address:*  *   [ 512 ]
WE WILL USE THIS ADDRESS TO CONTACT YOU DURING THE DELIVERY PROCESS, SO
IT'S IMPORTANT THAT THIS BE A VALID EMAIL ADDRESS.

*Please enter your zip code:*  *   [ 514 ]
BE SURE TO PROVIDE YOUR CORRECT ZIP CODE; WE USE IT TO CALCULATE LOCAL TAXES AND
FEES (SUCH AS STATE VEHICLE REGISTRATION) ON THE VEHICLES YOU CONFIGURE.

YOU WILL BE ABLE TO CHANGE YOUR ZIP CODE LATER, BUT REMEMBER THAT CALCULATING
YOUR FINAL PRICE IS DEPENDENT ON REGION. CHANGING YOUR ZIP CODE REQUIRES RE-
PRICING YOUR CAR. IF YOU CHANGE YOUR ZIP CODE, YOU MAY ALSO HAVE TO CHANGE THE
STATE, COUNTY, AND MUNICIPALITY WHERE THIS PURCHASE WILL INCUR TAXES OR OTHER
FEES, SUCH AS VEHICLE REGISTRATION.

(CARORDER.COM IS NOT RESPONSIBLE FOR PRICING ERRORS RESULTING FROM INCORRECT
INFORMATION SUPPLIED BY THE CUSTOMER.)

*FIG. 5A*

☑ CARORDER CONTACTS ITS USERS TO PASS ON PRICING UPDATES, SPECIAL SAVINGS, AND PROMOTIONS WHICH BECOME AVAILABLE FOR OUR CUSTOMERS. HOWEVER, IF YOU WOULD NOT LIKE TO RECEIVE SUCH MESSAGES, PLEASE CHECK THIS BOX. ⟵530

☐ DON'T SHARE MY SPECIFIC INFORMATION WITH REPUTABLE CARORDER.COM PARTNERS. ⟵532

How did you hear about carOrder.com? *

☐ RADIO AD ⟵540   ☐ TELEVISION AD ⟵542   ☐ MAGAZINE AD ⟵544   ☐ NEWSPAPER AD ⟵546   ☐ FRIEND ⟵548

☐ RADIO NEWS STORY ⟵550   ☐ TELEVISION NEWS STORY ⟵552   ☐ MAGAZINE NEWS STORY ⟵554   ☐ NEWSPAPER NEWS STORY ⟵556   ☐ OTHER ⟵558

[CREATE MY ACCOUNT]

Optional Account Information

THE FOLLOWING INFORMATION IS MAINTAINED IN YOUR USER PROFILE. YOU MAY FILL IT OUT NOW, BUT IT'S NOT REQUIRED TO ESTABLISH YOUR ACCOUNT. THIS INFORMATION WILL BE USED WHEN YOU PLACE AN ORDER WITH CARORDER.COM.

Street Address: ⟵516    Apartment/Suite: ⟵520

City: ⟵518

Daytime Phone Number: ⟵522    Evening Phone Number: ⟵524    Date of Birth: ⟵526

[CREATE MY ACCOUNT]

*FIG. 5B*

| | 402 | 404 | 406 | 408 | 410 | 412 |
|---|---|---|---|---|---|---|
| HOME | SITE MAP | HOW IT WORKS | WHY CHOOSE CARORDER.COM? | FAQs | PRIVACY & POLITICS | carOrder.com  RESEARCH CENTER | READY TO BUY | CARORDER SERVICES | MY VIRTUAL GARAGE 414   416   418   420

VIRTUAL GARAGE: WELCOME TO YOUR VIRTUAL GARAGE CHRIS CONNORS, WHERE YOU'LL SAVE AND RETRIEVE VEHICLES AND THEIR CONFIGURATIONS.   >>EDIT YOUR USER PROFILE

THERE ARE CURRENTLY 24 CARS PARKED IN YOUR VIRTUAL GARAGE — TOTALS: $148,202
2000 MERCEDES SL-CLASS SL600 CONVERTIBLE

CONFIGURED: 06/07/00 VALID UNTIL: 08/15/00
PRICE: $132,904 TAXES & FEES: $15,298

CLICK TO ENLARGE

YOUR OPTIONS: SL600, MANDATORY GAS GUZZLER TAX, CALYPSO GREEN SPECIAL (EXTERIOR COLOR), JAVA SOFT TOP (EXTERIOR ACCENT COLOR), BLACK (INTERIOR COLOR), PRODUCT: SL600, SPECIAL PAINT

CARORDER NOW OFFERS LEASING AND FINANCING THROUGH A SELECT GROUP OF PARTNERS. GET AN ESTIMATE ON A LEASE OR LOAN NOW.

[COMPARE TO...] [DELETE] [MODIFY] [MY INVOICE] [ORDER]

YOUR ORDERED CARS:

| NAME | Configured | Price | Ordered |
|---|---|---|---|
| 2000 BMW S SERIES S40 I SEDAN | 06/29/00 | $ 57,015 | 06/29/00 |
| 2000 AUDI S4 QUATTRO SEDAN | 05/31/00 | $80,706 | 05/31/00 |
| 2000 AUDI A6 2.7T QUATTRO SEDAN | 05/31/00 | $77,918 | 05/31/00 |
| 2000 BMW 7SERIES 750 II SEDAN | 05/15/00 | $15,789 | 05/15/00 |
| 2000 BMW 5 SERIES 540 I SEDAN | 04/26/00 | $53,620 | 04/26/00 |
| 2000 JAGUAR XK SERIES XKR CONVERTIBLE | 03/01/00 | $82,401 | 03/08/00 |
| 2000 BMW 5 SERIES 540 IT WAGON | 11/15/99 | $52,105 | 02/09/00 |
| 2000 AUDI A6-4.2 QUATTRO SEDAN | 11/01/99 | $47,561 | 11/09/99 |

YOUR SAVED CARS:

| NAME | Configured | Price* | Expires |
|---|---|---|---|
| 2000 MERCEDES SL-CLASS SL600 CONVERTIBLE | 06/07/00 | $ 132,904 | 08/15/00 |
| 2000 MERCEDES SL-CLASS SL500 CONVERTIBLE | 05/31/00 | ** | ** |
| 2000 AUDI A4 1.8T AVANT QUATTRO WAGON | 05/24/00 | ** | ** |
| 2000 ACURA INTEGRA GS-R SEDAN | 04/12/00 | ** | ** |
| 2000 ACURA INTEGRA GS-R SEDAN | 04/12/00 | ** | ** |
| 2000 ACURA INTEGRA GS-R SEDAN | 04/12/00 | ** | ** |
| 2000 ACURA INTEGRA GS-R SEDAN | 04/06/00 | ** | ** |
| 2000 BMW 7 SERIES 740 I SEDAN | 03/23/00 | ** | ** |

*FIG. 6A*

| | | | |
|---|---|---|---|
| 2000 MERCEDES E-CLASS E 320 AWD WAGON | 03/23/00 | ** | ** |
| 2000 BMW-5 SERIES 540 IT WAGON | 03/23/00 | ** | ** |
| 2000 BMW 3 SERIES 323 CI COUPE | 03/23/00 | ** | ** |
| 2000 ACURA INTEGRA LS COUPE | 03/23/00 | ** | ** |
| 2000 ACURA INTEGRA GS-R SEDAN | 03/23/00 | ** | ** |
| 2000 ACURA INTEGRA GS-R COUPE | 03/23/00 | ** | ** |
| 2000 ACURA INTEGRA GS SEDAN | 03/23/00 | ** | ** |
| 2000 ACURA INTEGRA GS COUPE | 03/23/00 | | |

*NOTE: DUE TO PERIODIC DATA UPDATES, VEHICLE PRICES MAY FLUCTUATE. CARORDER.COM GUARANTEES PRICES ON CARS SAVED TO YOUR VIRTUAL GARAGE FOR SEVEN DAYS FROM THE DAY THEY WERE ORIGINALLY SAVED. GUARANTEED PRICES EXPIRE AT MIDNIGHT CENTRAL TIME ON THE SEVENTH DAY AFTER THE CARS WERE SAVED.*

*IF YOU MODIFY A SAVED CONFIGURATION BEFORE THE SEVEN-DAY GUARANTEE HAS EXPIRED, THE CAR'S PRICE WILL BE SUBJECT TO CHANGE AND MAY BE RE-PRICED. UPON SAVING IT TO YOUR VIRTUAL GARAGE, THE NEXT PRICE WILL BE GUARANTEED FOR AN ADDITIONAL SEVEN DAYS.*

TYPOGRAPHICAL ERRORS
*IN THE EVENT A PRODUCT IS LISTED AT AN INACCURATE PRICE DUE TO TYPOGRAPHICAL ERROR OR ERROR IN PRICING INFORMATION, CARORDER.COM HAS THE RIGHT TO REFUSE OR CANCEL ANY ORDERS PLACED FOR PRODUCT LISTED AT THE INCORRECT PRICE. CARORDER.COM SHALL HAVE THE RIGHT TO REFUSE OR CANCEL ANY SUCH ORDERS WHETHER OR NOT THE ERROR HAS BEEN CONFIRMED.*
*\*\*NOTE: CARORDER.COM PRICING IS BASED ON REGION. CHANGING YOUR ZIP CODE REQUIRES RE-PRICING YOUR CARS.*

CONTACTING US | PRESS | JOBS | TERMS OF USE | AFFILIATE | GLOSSARY    ✉ QUESTIONS@CARORDER.COM

☏ 1.888.657.CARS (2277)

*FIG. 6B*

| 402 | 404 | 406 | 408 | 410 | 412 |

| HOME | SITE MAP | HOW IT WORKS | WHY CHOOSE CARORDER.COM? | FAQs | PRIVACY & POLITICS |

carOrder.com — RESEARCH CENTER — READY TO BUY — CARORDER SERVICES — MY VIRTUAL GARAGE 414   416   418   420

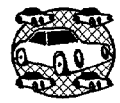

BROWSE CURRENT MODELS:
SELECT MY STATE

PLEASE SELECT A STATE FROM THE LIST PROVIDED SO THAT WE MAY ACCURATELY DETERMINE PRICING AND AVAILABILITY FOR YOUR REGION. IF YOUR STATE IS NOT LISTED, PLEASE SELECT "OTHER STATES" BELOW.

◄◄◄ BACK TO FIND MY CAR   ⟵ 820

| SELECT THE STATE IN WHICH YOU CURRENTLY RESIDE | | | |
|---|---|---|---|
| STATES | | | |
| CALIFORNIA NORTHERN | CALIFORNIA SOUTHERN | CONNECTICUT | DELAWARE |
| FLORIDA | MAINE | NEW HAMPSHIRE | NEW JERSEY |
| NEW YORK | VERMONT | OTHER STATE | |

⟵ 810

SUPPLYING US WITH YOUR STATE WILL ALLOW CARORDER.COM TO PROVIDE YOU WITH THE MOST ACCURATE AVAILABILITY AND PRICING INFORMATION. BECAUSE THE LOCATION YOU ENTER WILL DETERMINE THE PRICE AND AVAILABILITY OF YOUR VEHICLE, WE CANNOT BE RESONSIBLE FOR PRICING ERRORS THAT RESULT FROM INCORRECT INFORMATION.

800

| 438 | 440 | 442 | 444 | 446 | 448 | 480 |

CONTACTING US | PRESS | JOBS | TERMS OF USE | AFFILIATE | GLOSSARY     ✉ QUESTIONS @ CARORDER.COM

✆ 1.888.657.CARS (2277)

FIG. 8A

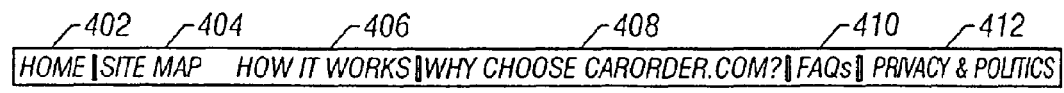

 **BROWSE CURRENT MODELS:
SELECT MANUFACTURER**

◂◂◂ BACK TO RESEARCH CENTER — 870

| PICK A MAKE FROM THE SELECTIONS BELOW | | | | |
|---|---|---|---|---|
| MANUFACTURERS | | | | |
| ACURA | AUDI | BMW | BUICK | CADILLAC |
| CHEVROLET | CHRYSLER | DAEWOO | DODGE | FORD |
| GMC | HONDA | HYUNDAI | INFINITI | ISUZU |
| JAGUAR | JEEP | KIA | LAND ROVER | LEXUS |
| LINCOLN | MAZDA | MERCEDES | MERCURY | MITSIBISHI |
| NISSAN | OLDSMOBILE | PONTIAC | PORSCHE | SAAB |
| SATURN | SUBARU | SUZUKI | TOYOTA | VOLKSWAGON |
| VOLVO | | | | |

ARE WE MISSING A MANUFACTURER YOU'RE INTERESTED IN?
CLICK HERE TO TELL US WHAT YOU'D LIKE TO SEE.    850

*FIG. 8B*

| 402 | 404 | 406 | 408 | 410 | 412 |
|---|---|---|---|---|---|
| HOME | SITE MAP | HOW IT WORKS | WHY CHOOSE CARORDER.COM? | FAQs | PRIVACY & POLITICS | carOrder.com™  | RESEARCH CENTER | READY TO BUY | CARORDER SERVICES | MY VIRTUAL GARAGE |
414  416  418  420

BROWSE CURRENT MODELS:
SELECT MODEL

◂◂◂ BACK TO RESEARCH CENTER (940) OR PICK A NEW MANUFACTURER (950)

910

| PICK A MODEL FROM THE SELECTIONS BELOW |||
|---|---|---|
| JEEP |||
| | 2000 CHEROKEE<br>THE JEEP CHEROKEE, THE FIRST 4-DOOR COMPACT SPORT UTILITY VEHICLE, IS ALSO AVAILABLE WITH 2 DOORS | LEARN MORE... ~920<br>BUILD IT... ~930 |
| | 2000 GRAND CHEROKEE<br>THE 2000 JEEP GRAND CHEROKEE, THE LAREDO AND THE LIMITED FEATURE UNIBODY CONSTRUCTION AND OPTIONAL FOUR WHEEL DRIVE. | LEARN MORE... ~922<br>BUILD IT... ~932 |
| | 2000 WRANGLER<br>THE 2000 WRANGLER JEEPS' SMALLEST SPORT-UTILITY VEHICLE COMES WITH A FOLDING CONVERTIBLE TOP WITH SOFT WINDOWS. | LEARN MORE... ~924<br>BUILD IT... ~934 |

ARE WE MISSING A MANUFACTURER YOU'RE INTERESTED IN?
CLICK HERE TO TELL US WHAT YOU'D LIKE TO SEE.

900

| 438 | 440 | 442 | 444 | 446 | 448 | 480 |
|---|---|---|---|---|---|---|
| CONTACTING US | PRESS | JOBS | TERMS OF USE | AFFILIATE | GLOSSARY | ✉ QUESTIONS @ CARORDER.COM |

✆ 1.888.657.CARS (2277)

FIG. 9

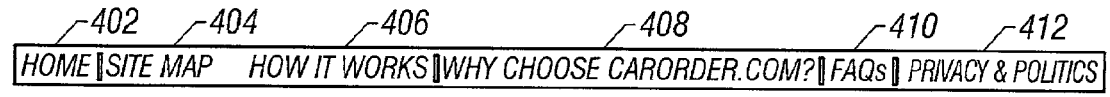

BROWSE CURRENT MODELS:
LEARN MORE: 2000 JEEP GRAND CHEROKEE

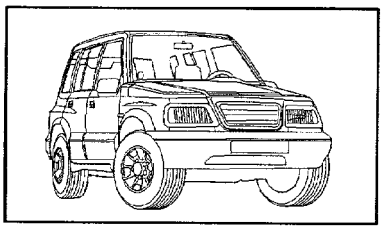

CLICK TO ENLARGE

OVERVIEW | PERFORMANCE | FEATURES

VEHICLE TYPE: 4-DOOR SPORT UTILITY VEHICLE

PERFORMANCE: 4.0L, 196HP 16

FEATURES: ABS BRAKES, DUAL AIRBAGS, CHILD SAFETY LOCKS

COMPARE TO: HONDA PASSPORT, FORD EXPLORER, NISSAN PATHFINDER

THE JEEP GRAND CHEROKEE IS AVAILABLE IN TWO TRIMLINES, THE LIMITED AND THE LAREDO, EACH OF WHICH COMES STANDARD WITH DUAL NEXT-GENERATION AIRBAGS, ANTI-LOCK BRAKES, REMOTE KEYLESS ENTRY, AND CRUISE CONTROL, THE GRAND CHEROKEE LIMITED ALSO COMES WITH LEATHER SEATS, AN AUXILIARY POWER OUTLET IN THE CARGO AREA, AND A CD PLAYER, OPTIONS INCLUDE FOUR-WHEEL DRIVE, POWER BUCKET SEATS AND A SUNROOF.

CONTACTING US | PRESS | JOBS | TERMS OF USE | AFFILIATE | GLOSSARY    ✉ QUESTIONS @ CARORDER.COM

✆ 1.888.657.CARS (2277)

| 402 | 404 | 406 | 408 | 410 | 412 |
|---|---|---|---|---|---|
| HOME | SITE MAP | HOW IT WORKS | WHY CHOOSE CARORDER.COM? | FAQs | PRIVACY & POLITICS | carOrder.com

- RESEARCH CENTER — 414
- READY TO BUY — 416
- CARORDER SERVICES — 418
- MY VIRTUAL GARAGE — 420

BROWSE CURRENT MODELS:
LEARN MORE: 2000 JEEP GRAND CHEROKEE

VEHICLE TYPE:  4-DOOR SPORT UTILITY VEHICLE

PERFORMANCE:  4.0L, 196HP I6

FEATURES:  ABS BRAKES, DUAL AIRBAGS, CHILD SAFETY LOCKS

COMPARE TO:  HONDA PASSPORT, FORD EXPLORER, NISSAN PATHFINDER

CLICK TO ENLARGE

FEATURES     OVERVIEW (1220) | PERFORMANCE (1230)

1210:
- THEFT-DETERRENT SYSTEM
- DUAL AIRBAGS
- ABS BRAKES
- AIR CONDITIONING
- AM/FM CASSETTE STEREO
- PROGRAMMABLE INFORMATION CENTER WITH TRIP COMPUTER, FUEL ECONOMY, AND COMPASS
- 16-INCH ALUMINUM WHEELS
- CRUISE CONTROL
- LIMITED: DUAL 10-WAY POWER FRONT SEATS, LEATHER UPHOLSTERY, CD PLAYER, AUXILIARY POWER OUTLET, REMOTE KEYLESS ENTRY, DUAL-ZONE CLIMATE CONTROL

1200

| 1070 LIVE GOT A QUESTION? << ASK HERE | 1040 Pick a new Make or Model | 1050 continue | 1060 Build this Car |

| 438 | 440 | 442 | 444 | 446 | 448 | 480 |
|---|---|---|---|---|---|---|
| CONTACTING US | PRESS | JOBS | TERMS OF USE | AFFILIATE | GLOSSARY | QUESTIONS @ CARORDER.COM |

1.888.657.CARS (2277)

*FIG. 12*

```
┌402  ┌404    ┌406      ┌408              ┌410     ┌412
│HOME│SITE MAP│HOW IT WORKS│WHY CHOOSE CARORDER.COM?│FAQs│PRIVACY & POLITICS│
``` carOrder.com™   RESEARCH CENTER | READY TO BUY | CARORDER SERVICES | MY VIRTUAL GARAGE
                    └414            └416           └418                └420

WHICH CAR IS FOR ME:
SEARCH BY FEATURE

USE THE MENUS BELOW TO IDENTIFY VEHICLES OFFERED WITH THE FEATURES YOU'D LIKE:

| | | SELECT A BODY STYLE: | | 17 Vehicles Found: |
|---|---|---|---|---|
| 1310 | $ PRICE RANGE $50,000 TO $59... | ☐ SEDAN   ☐ WAGON | | AUDI |
| 1320 | VEHICLE TYPE | ☐ COUPE   ☐ CONVERTIBLE | | 2001 A6 |
| 1330 | ENGINE | ☐ PICKUP  ☐ SPORT UTILITY | | BMW |
|      |        | SELECT A LAYOUT: | | 2001 X5 |
| 1340 | FUEL ECONOMY | ☐ FRONT ENGINE  ☐ MID ENGINE | | 2000 5 SERIES |
|      |              | ☐ REAR ENGINE | | 2000 X5 |
| 1350 | INTERIOR | SELECT A DRIVETRAIN TYPE: | | CADILLAC |
| 1360 | SAFETY | ☐ FRONT WHEEL DRIVE  ☐ REAR WHEEL DRIVE | | 2000 SEVILLE |
|      |        | ☐ ALL WHEEL DRIVE    ☐ FOUR WHEEL DRIVE | | INFINITI |

└1410

17 Vehicles Found:
AUDI
2001 A6
BMW
2001 X5
2000 5 SERIES
2000 X5
CADILLAC
2000 SEVILLE
INFINITI
2000 Q45
JAGUAR
2000 S-TYPE
2000 XJ SERIES
LAND ROVER
2000 RANGE ROVER
LEXUS
2000 LS 400
2000 SC 400
MERCEDES
2001 SLK-CLASS
2000 C-CLASS
2000 CLK-CLASS
2000 E-CLASS
PORSHE
2000 BOXSTER
TOYOTA
2000 LAND CRUISER

1370

1400

┌438       ┌440   ┌442  ┌444        ┌446      ┌448       ┌480
CONTACTING US | PRESS | JOBS | TERMS OF USE | AFFILIATE | GLOSSARY   ✉ QUESTIONS@CARORDER.COM

☏ 1.888.657.CARS (2277)

FIG. 14

METHOD AND APPARATUS FOR SORTING PRODUCTS BY FEATURES

CROSS-REFERENCE TO RELATED APPLICATIONS

This application is a continuation-in-part of patent application Ser. No. 09/760,059, entitled "METHOD AND APPARATUS FOR SORTING PRODUCTS BY FEATURES," filed Jan. 12, 2001 now abandoned and having C. Connors, A. Miller, J. Walsky, J. Van Dyke, J. Singh and A. Leamon as inventors (which claims priority to Provisional Patent Application No. 60/176,117, entitled "SYSTEM AND METHOD FOR FACILITATING COMMERCIAL TRANSACTIONS OVER A DATA NETWORK," filed Jan. 14, 2000 and having J. Walsky and S. Aboel-Nil as inventors); and is related to patent application Ser. Nos. 09/760,062 (filed Jan. 12, 2001) and 09/770,137 (filed Jan. 26, 2001), both entitled "METHOD AND APPARATUS FOR PRODUCT COMPARISON," and both having C. Connors, A. Miller, J. Walsky, J. Van Dyke, J. Singh and A. Leamon as inventors, and patent application Ser. Nos. 09/760,061 (filed Jan. 12, 2001) and 09/770,522, filed Jan. 26, 2001, both entitled "SYSTEM AND METHOD FOR FACILITATING COMMERCIAL TRANSACTIONS OVER A DATA NETWORK," and both having J. Walsky as inventor. These applications are assigned to Trilogy Development Group, Inc., the assignee of the present invention, and are hereby incorporated by reference, in their entirety and for all purposes.

BACKGROUND OF THE INVENTION

1. Field of the Invention

The present invention relates to transacting commerce over a network, and, more particularly, to a method and apparatus for processing information related to such commercial transactions.

2. Description of the Related Art

Historically, information regarding commercially available products has been disseminated using various types of well-known media, including print, radio, television and the like. The operation of such media has been patently obvious, and its use self-evident. With the advent of the Internet, a wide array of product information has become even more accessible to the average person.

Entities providing such product information have been assisted in their endeavor by networking and client/server technology that has become available in approximately the last ten to fifteen years. Such client/server arrangements typically allow a number of users employing client terminals to communicate with a remote server computer in order to transfer information therebetween. This information may include text, data in any one of a number of formats, graphical information, streaming audio and video, and other such information. To facilitate such transfers, client terminals can employ a "web" browser that provides access to a server via a graphical user interface (GUI). The server responds to requests from the client by providing information in the form of a "web page." One popular collection of servers uses Hypertext Transfer Protocol (HTTP) to provide information. This assemblage is known as the "World Wide Web" (WWW). A collection of related web pages is often referred to as a "website," or more simply a "site." The information is typically presented as web pages written as text with standardized formatting and control symbols known as Hypertext Mark-up Language (HTML). HTML provides basic hypertext document formatting and allows a server to specify "links" to other servers and files. Use of an HTML-compliant browser involves specification of a link via a Uniform Resource Locator (URL). Upon such specification, the user's client terminal makes a TCP/IP request to the server identified in the link and receives an HTML file that is interpreted by the browser so that an electronic HTML document made up of one or more web pages may be displayed on the client's terminal.

Unfortunately, however, the use of such functionality for the selection and purchase of products is less than ideal. This is especially true in the case where comparable products exist. Especially when faced with a large number of comparable products, it is natural for a consumer to want to compare such products (e.g., in side-by-side fashion), in order to better understand the differences between the products, and the advantages of each. Moreover, when making such comparisons, and when employing web-based technology in general, reducing the need for user interaction can improve a website's ability to handle increased traffic, and ultimately, the consumer's buying experience.

SUMMARY OF THE INVENTION

In one embodiment of the present invention, a software architecture is disclosed. The software architecture includes a database layer, a services layer (coupled to said database layer) and a needs analysis module (coupled to said services layer).

In various aspects of this embodiment, the software architecture further includes the following features. For example, the needs analysis module can be configured to permit identification of a product based on attribute information. Moreover, the services layer can include a filter service. The filter service can be configured to provide a product identifier to the needs analysis module in response to a product attribute received from the needs analysis module, where the product identifier identifies a product, and the product attribute is an attribute of the product. Similarly, the database layer can include a database, with the filter service being configured to use the product attribute to retrieve the product identifier from the database.

In another aspect of this embodiment, the software architecture's needs analysis module is configured to permit identification of a product configuration based on product identifier information. To achieve this end, the services layer can include a configuration service. The product identifier identifies a product. The configuration service can be configured to provide a configuration list to the needs analysis module in response to a product identifier received from the needs analysis module.

In one embodiment of the present invention, a software architecture is disclosed. The software architecture includes a database layer and a services layer. The services layer is coupled to the database layer and includes a filter service.

In various aspects of this embodiment, the software architecture further includes the following features. For example, the filter service can be configured to permit identification of a product based on attribute information. Moreover, the software architecture can further include a module layer coupled to the services layer, which includes a needs analysis module. The filter service can be configured to provide a product identifier to the needs analysis module in response to a product attribute received from the needs analysis module, with the product identifier identifying a product and the product attribute being an attribute of the product. Similarly, the database layer can include a database, with the filter service configured to use the product attribute to retrieve the product identifier from the database.

In one embodiment of the present invention, a software architecture is disclosed. The software architecture includes a database layer and a services layer. The services layer is coupled to the database layer and includes a configuration service.

In various aspects of this embodiment, the software architecture further includes the following features. For example, the needs analysis module can be configured to permit identification of a product configuration based on product identifier information. Similarly, the configuration service can be configured to permit identification of a product based on a product identifier.

In another aspect of this embodiment, the software architecture includes a module layer that is coupled to the services layer. The module layer can include a needs analysis module. In a further aspect, the configuration service is configured to provide a configuration list to the needs analysis module in response to a product identifier received from the needs analysis module, where the product identifier identifies a product.

In one embodiment of the present invention, a method for identifying a product is disclosed. The method includes selecting a selected feature from a number of features, determining which of the products is configured with the selected feature and identifying the product as being configured with the selected feature. In this embodiment, the product is one of a number of products, the product is configured with the selected feature, and each of the products is configured with at least one of the features. In one aspect of this embodiment, the selected feature is one of a number of selected features, the selected features form a product configuration, and the product configuration is an allowable product configuration.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIGS. 5A and 5B, referred to herein generally as FIG. 5, illustrate a plan view of a web page employed to allow users to register in order to gain access to the present invention.

FIGS. 6A and 6B, referred to herein generally as FIG. 6, illustrate a plan view of a web page that is uniquely associated with a user and on which product-related information stored on a server is accessed, in accordance with the present invention.

FIG. 8A is a plan view of a web page for entering information regarding a user's location according to embodiments of the present invention.

FIG. 8B is a plan view of a web page for entering information regarding a desired manufacturer according to embodiments of the present invention.

FIG. 9 is a plan view of a web page through which a user can access product-related information for selected products according to embodiments of the present invention.

FIG. 10 is a plan view of a web page through which a user can access product-related information for a selected product according to embodiments of the present invention.

Figure 11:
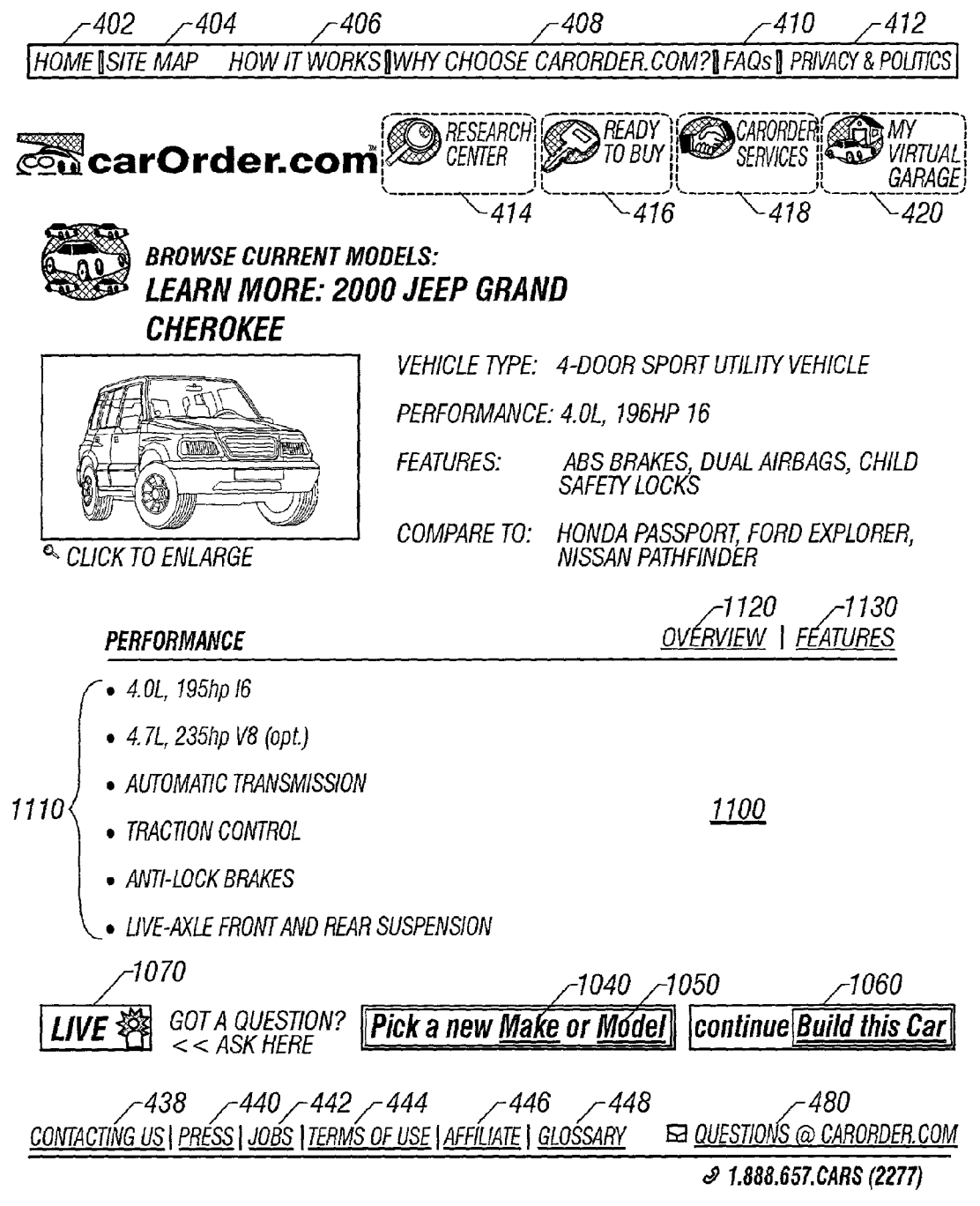

FIG. 11 is a plan view of a page through which a user can access product-related performance information for a selected product according to embodiments of the present invention.

FIG. 12 is a plan view of a web page through which a user can access product-related feature information for a selected product according to embodiments of the present invention.

FIG. 14 is a plan view of a web page that allows a user to identify a desired product by vehicle type according to embodiments of the present invention.

The use of the same reference symbols in different drawings indicates similar or identical items.

DETAILED DESCRIPTION OF THE INVENTION

The following is intended to provide a detailed description of an example of the invention and should not be taken to be limiting of the invention itself. Rather, any number of variations may fall within the scope of the invention which is defined in the claims following the description.

Introduction

The present invention provides a software architecture and process that allows a user the ability to identify a product (or configurations thereof) by specifying attributes desired of the product using, for example, a WWW interface such as a web browser to access the requisite information remotely (e.g., over a network such as the Internet). Using a website employing such a software architecture (also referred to herein as a website architecture), a user is able to identify allowable product configurations (allowable combinations of features (i.e., attributes); also referred to more simply herein as configurations) based on product attributes (also referred to herein as attribute information), display the allowable product configurations thus selected, identify the features (attributes) of a given product, generate comparable product configurations, store the product configuration(s) and perform related tasks. The foregoing functionalities are provided by a software module (referred to herein as a needs analysis module) that enables the identification of products based on their features (i.e., attributes). These functionalities are enhanced by the use of a database structure that permits the retrieval of configurations and/or related attributes using a product identifier (or more simply, an identifier), a configuration, one or more product attributes or other such information. Moreover, by persisting configuration information throughout such a system, a user need not re-enter product information, thus enhancing the user's purchasing experience.

An Example Computing and Network Environment

Figure 1:
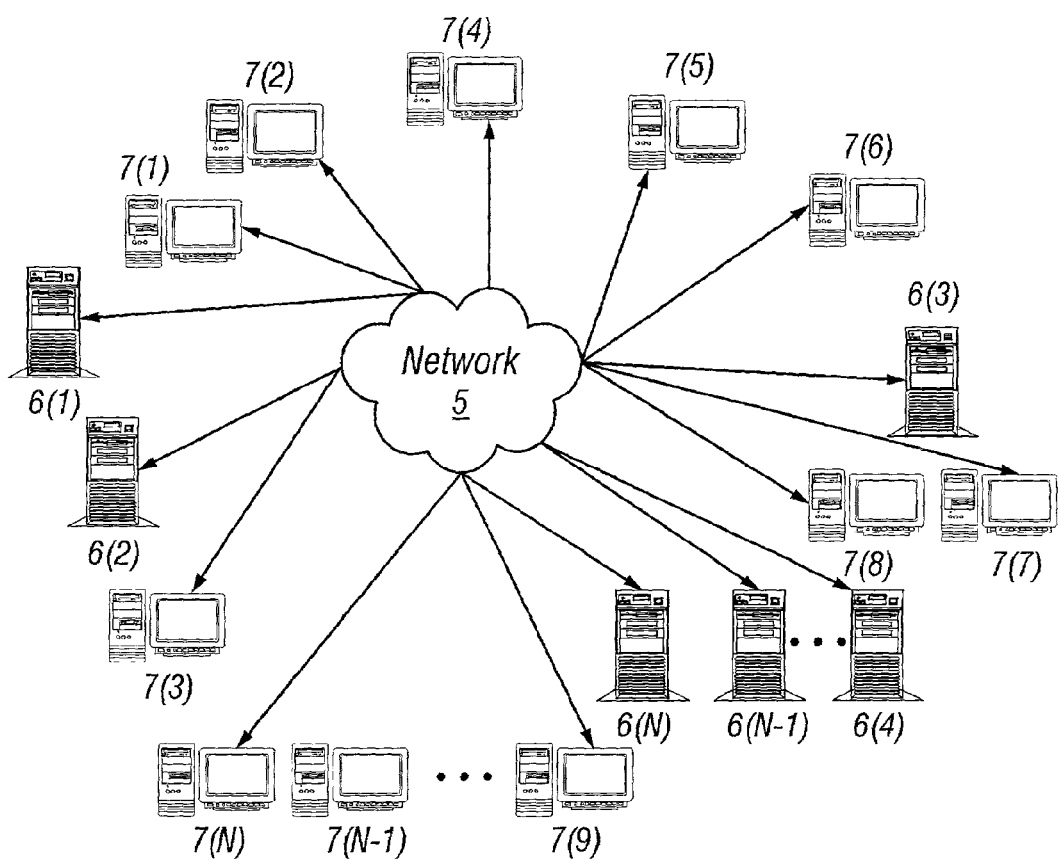
FIG. 1 is a block diagram illustrating a network environment in which commercial transaction processing according to embodiments of the present invention may be practiced.

FIG. 1 is a block diagram illustrating a network environment in which a commercial transaction processing system according to the present invention may be practiced. As is illustrated in FIG. 1, network 5, such as a private wide area network (WAN) or the Internet, includes a number of networked servers 6(1)-(N) that are accessible by client terminals 7(1)-(N). Communication between client terminals 7(1)-(N) and servers 6(1)-(N) typically occurs over a publicly accessible network, such as a public switched telephone network over ADSL telephone lines or large bandwidth trunks, for example communications channels providing T1 or OC3 service. Client terminals 7(1)-(N) access servers 6(1)-(N) through a service provider, e.g., an Internet service provider such as America On-Line™, Prodigy™, CompuServe™ and the like, by executing application specific software, commonly referred to as a browser, on one of client terminals 7(1)-(N).

One or more of client terminals 7(1)-(N) and/or one or more of servers 6(1)-(N) may be, for example, a computer system of any appropriate design, in general, including a mainframe, a mini-computer or a personal computer system. Such a computer system typically includes a system unit having a system processor and associated volatile and non-volatile memory, one or more display monitors and keyboards, one or more diskette drives, one or more fixed disk storage devices and one or more printers. These computer systems are typically information handling systems which are designed to provide computing power to one or more users, either locally or remotely. Such a computer system may also include one or a plurality of I/O devices (i.e. peripheral devices) which are coupled to the system processor and which perform specialized functions. Examples of I/O devices include modems, sound and video devices and specialized communication devices. Mass storage devices such as hard disks, CD-ROM drives and magneto-optical drives may also be provided, either as an integrated or peripheral device. One such example computer system, discussed in terms of client terminals 7(1)-(N) is shown in detail in FIG. 2.

Figure 2:
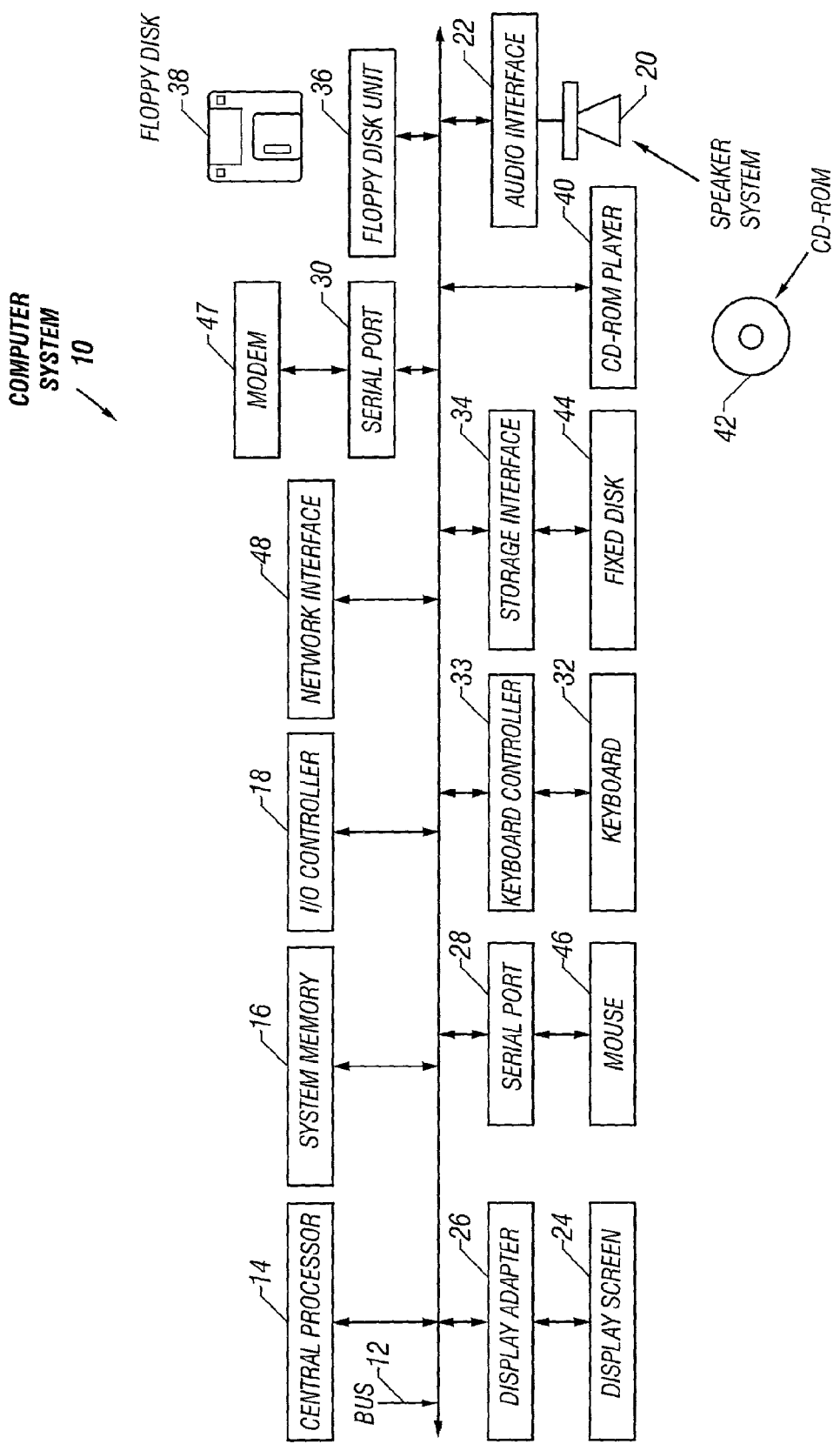
FIG. 2 depicts a block diagram of a computer system suitable for implementing embodiments of the present invention.

FIG. 2 depicts a block diagram of a computer system 10 suitable for implementing the present invention, and example of one or more of client terminals 7(1)-(N). Computer system 10 includes a bus 12 which interconnects major subsystems of computer system 10 such as a central processor 14, a system memory 16 (typically RAM, but which may also include ROM, flash RAM, or the like), an input/output controller 18, an external audio device such as a speaker system 20 via an audio output interface 22, an external device such as a display screen 24 via display adapter 26, serial ports 28 and 30, a keyboard 32 (interfaced with a keyboard controller 33), a storage interface 34, a floppy disk drive 36 operative to receive a floppy disk 38, and a CD-ROM drive 40 operative to receive a CD-ROM 42. Also included are a mouse 46 (or other point-and-click device, coupled to bus 12 via serial port 28), a modem 47 (coupled to bus 12 via serial port 30) and a network interface 48 (coupled directly to bus 12).

Bus 12 allows data communication between central processor 14 and system memory 16, which may include both read only memory (ROM) or flash memory (neither shown), and random access memory (RAM) (not shown), as previously noted. The RAM is generally the main memory into which the operating system and application programs are loaded and typically affords at least 16 megabytes of memory space. The ROM or flash memory may contain, among other code, the Basic Input-Output system (BIOS) which controls basic hardware operation such as the interaction with peripheral components. Applications resident with computer system 10 are generally stored on and accessed via a computer readable medium, such as a hard disk drive (e.g., fixed disk 44), an optical drive (e.g., CD-ROM drive 40), floppy disk unit 36 or other storage medium. Additionally, applications may be in the form of electronic signals modulated in accordance with the application and data communication technology when accessed via network modem 47 or interface 48.

Storage interface 34, as with the other storage interfaces of computer system 10, may connect to a standard computer readable medium for storage and/or retrieval of information, such as a fixed disk drive 44. Fixed disk drive 44 may be a part of computer system 10 or may be separate and accessed through other interface systems. Many other devices can be connected such as a mouse 46 connected to bus 12 via serial port 28, a modem 47 connected to bus 12 via serial port 30 and a network interface 48 connected directly to bus 12. Modem 47 may provide a direct connection to a remote server via a telephone link or to the Internet via an internet service provider (ISP). Network interface 48 may provide a direct connection to a remote server via a direct network link to the Internet via a POP (point of presence). Network interface 48 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 2 to be present to practice the present invention. The devices and subsystems may be interconnected in different ways from that shown in FIG. 2. The operation of a computer system such as that shown in FIG. 2 is readily known in the art and is not discussed in detail in this application. Code to implement the present invention may be operably disposed or stored in computer-readable storage media such as one or more of system memory 16, fixed disk 44, CD-ROM 42, or floppy disk 38. Additionally, computer system 10 may be any kind of computing device, and so includes personal data assistants (PDAs), network appliance, X-window terminal or other such computing device. The operating system provided on computer system 10 may be MS-DOS®, MS-WINDOWS®, OS/2X, UNIX®, Linux® or other known operating system. Computer system 10 also supports a number of Internet access tools, including, for example, an HTTP-compliant web browser having a JavaScript interpreter, such as Netscape Navigator® 3.0, Microsoft Explorer® 3.0 and the like.

It will be noted that the variable identifier "N" is used in several instances in FIG. 2 to more simply designate the final element (e.g., servers 6(1)-(N) and client terminals 7(1)-(N)) of a series of related or similar elements (e.g., servers and client terminals). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 10). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Figure 3:
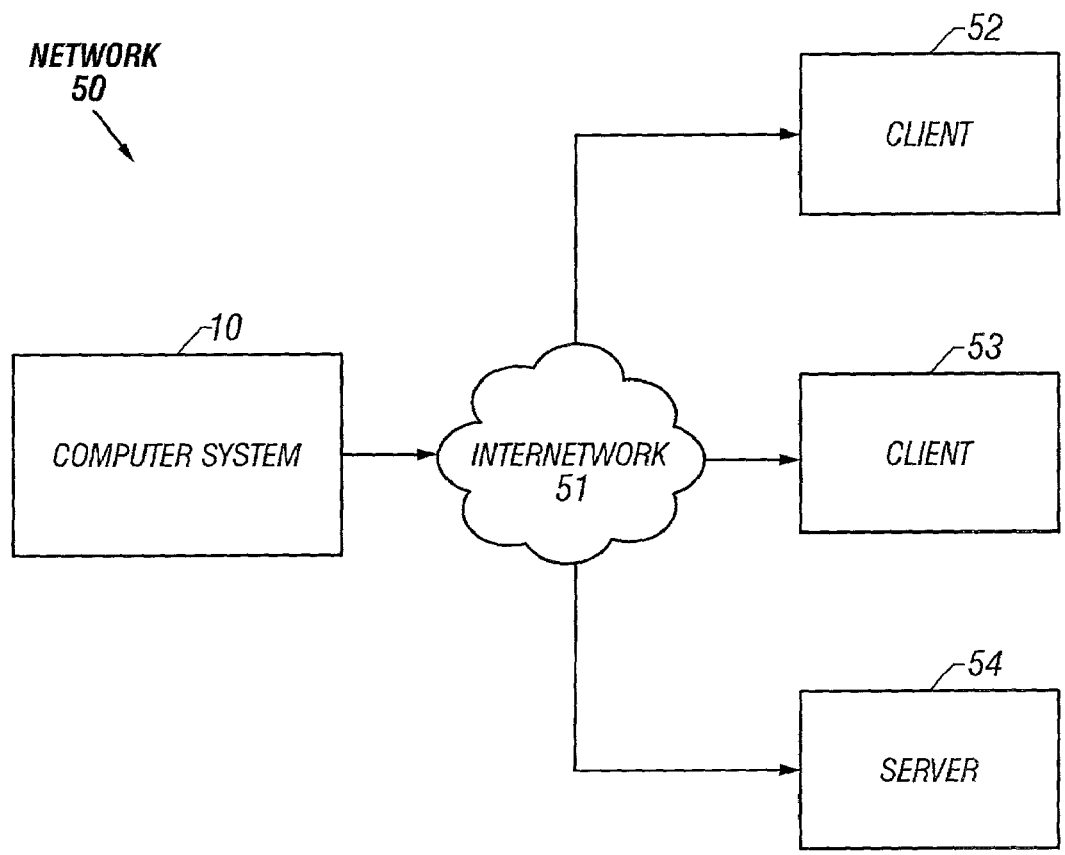
FIG. 3 depicts the interconnection of the computer system of FIG. 2 to client and host systems.

FIG. 3 is a block diagram depicting a network 50 in which computer system 10 is coupled to an internetwork 51, which is coupled, in turn, to client systems 52 and 53, as well as a server 54. Internetwork 51 (e.g., the Internet) is also capable of coupling client systems 52 and 53, and server 54 to one another. With reference to computer system 10, modem 47, network interface 48 or some other method can be used to provide connectivity from computer system 10 to internetwork 51. Computer system 10, client system 52 and client system 53 are able to access information on server 54 using, for example, a web browser (not shown). Such a web browser allows computer system 10, as well as client systems 52 and 53, to access data on server 54 representing the pages of a website hosted on server 54. Protocols for exchanging data via the Internet are well known to those skilled in the art. Although FIG. 3 depicts the use of the Internet for exchanging data, the present invention is not limited to the Internet or any particular network-based environment.

Referring to FIGS. 1, 2 and 3, a browser running on computer system 10 employs a TCP/IP connection to pass a request to server 54, which can run an HTTP "service" (e.g., under the WINDOWS® operating system) or a "daemon" (e.g., under the UNIX® operating system), for example. Such a request can be processed, for example, by contacting an HTTP server 10a at the following address "http://www-.carOrder.com," employing a protocol that can be used to communicate between the server 10a and the client terminal 12. The HTTP server 10 then responds to the protocol, typically by sending a "web page" formatted as an HTML file. The browser interprets the HTML file and may form a visual representation of the same using local resources, e.g., fonts and colors.

Referring to FIGS. 1, 2 and 3, server 54 (which includes an HTTP server, as previously noted) can further include a web server (not shown), an application server (also not shown) and a database server operating with an open distributed object computing infrastructure such as Common Object Request Broker Architecture (CORBA) (also not shown). The web server can include a user interface layer and a centralized dispatch mechanism, both of which are typically implemented employing Java Server Pages (JSP).

One advantage of employing JSP is that the use of JSP facilitates organization of a website as a state machine. In this manner, the logical organization of a website can be arranged in categories, for example: Controls, States and Transitions. Controls include a Java class of elements that manage the active elements of a page such as render control text or interpret user's action with respect to a page. Examples of controls would be the management of a virtual button on a web page or login management that could include providing a number of dialog boxes containing text and a virtual button. States define a user's current location on the website (e.g., in a state machine), such as the web page that a user is presently viewing. States also define the relationship of a user with respect to a web page being viewed. Transitions define the new state of a user and are a function of a users interaction with a page. Specifically, a transition is defined by the user's current state and the actions taken by the user while in that state (e.g., the result of user operation on a control alters the users state). Simply put, the user's new state is simply defined as the user's current state, as modified by the transition selected. The transitions are located in a transition module that is responsible for all transitions.

Advantages of the state machine model of the website are that it is has maintainability to facilitate update flow or pages very easily and per user state machine. service different users with maximum code reuse. It is also consistent in that most or all server logic is handled under the same paradigm. Login control, record and display controls cause transitions which update state. Typically, XML/XSL defines the state machine, page content and layout. It can also be compatible with the Wireless Application Protocol (WAP). This can extend existing web site to provide different state machines for WAP users.

Also included in the web server is a control layer and a module layer, both implemented in the Java programming language. The applications on the application server can be implemented, for example, in the Java programming language.

An Example Architecture Supporting Product Comparison

Figure 4:
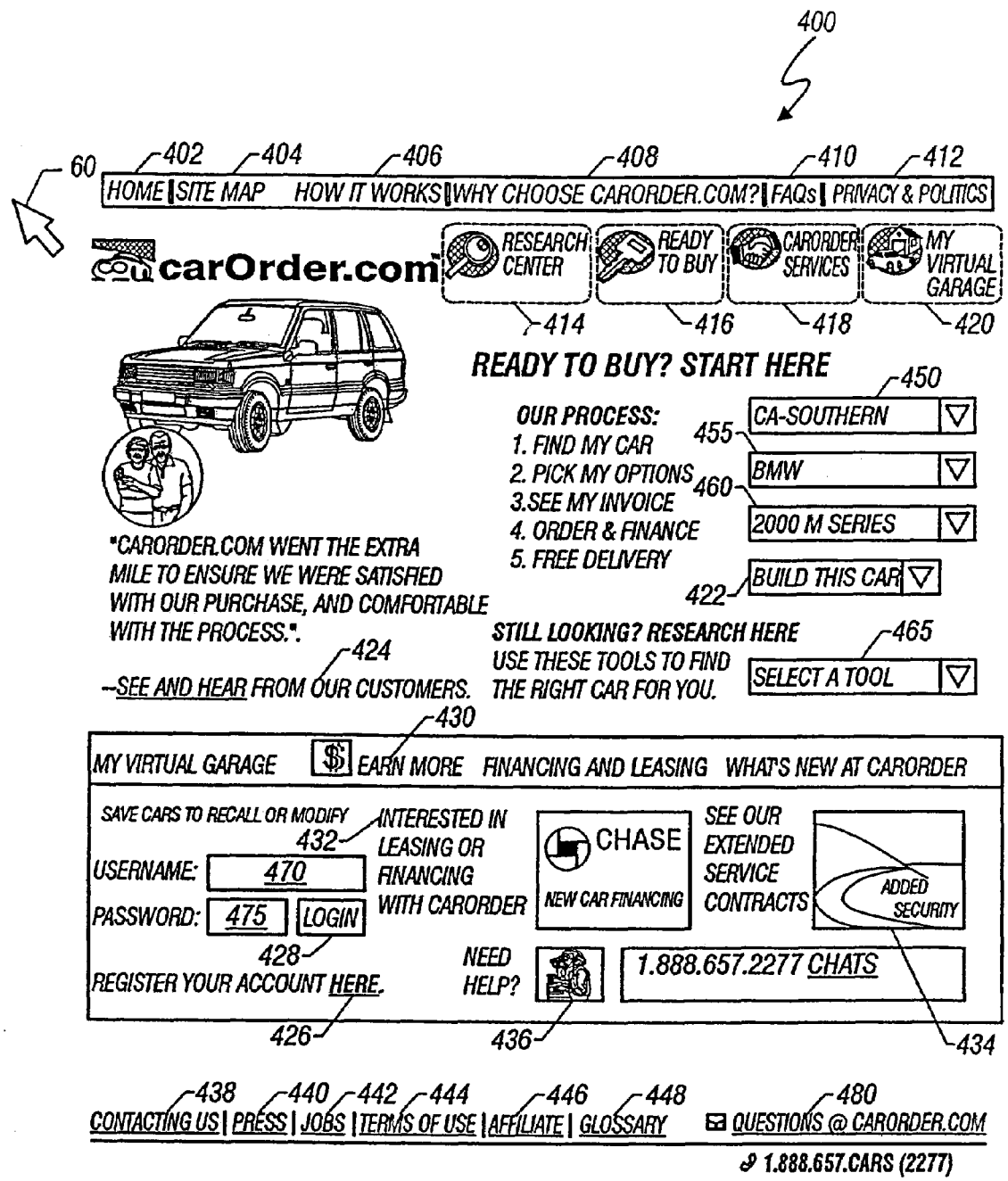
FIG. 4 is a plan view of a web page having a visual representation of a hypertext link and data entry regions employed to access the present invention.

FIG. 4 is an example screen layout illustrating a visual representation of a "web page" 400 presented on display screen 24, for example, at the aforementioned URL address. Web page 400 includes, inter alia, a hypertext link 402. Employing a mouse (e.g.) mouse 46, a cursor 60 can be placed proximate to hypertext link 402, entitled "home" and a cursor event is effectuated (i.e., hypertext link 402 is activated). Activating hypertext link 402 results in a visual representation of web page 400 being present on display screen 24. In this manner, hypertext link 402 connects to web page 400 by having the same rendered on display screen 24. Web page 400 includes a number of hypertext links 402-448, as well as a number of data entry fields 450-475. Also included on web page 400 is a hypertext link 480 for connecting to information promulgated over the Internet via e-mail, for example.

Hypertext links 414, 416, 418 and 434 connect to additional web pages that are in data communication with databases having information concerning products that are the subject of commercial transactions over the data network. For example, in the case of new vehicle sales, hypertext link 414 allows the user to navigate to a page that includes information concerning various models of vehicles. Hypertext link 416 can include information concerning the ordering of a vehicle having a desired set of features. Hypertext link 418 can include information concerning various services provided by carOrder.com. Hypertext link 434 can include information concerning financing of a vehicle to be purchased. Hypertext link 420, on the other hand, allows the user to navigate to a web page displaying information concerning vehicles already selected as being suitable for purchase by the user, as discussed in detail subsequently.

Hypertext links 406-412, 430 and 438-448 are provided to inform users of certain information not germane to a description of embodiments of the present invention. For example, hypertext links 406, 410 and 448 connect to web pages that explain how to use the carOrdercom website. Hypertext links 408, 438, 440 and 442 provide company information concerning carOrder.com, such as summary of the company, services available and benefits thereof, press releases, jobs available, how to contact the company and so on. Hypertext link 412 describes how privacy is maintained on the website. Hypertext link 402 connects to web page 400, and hypertext link 444 discusses the terms and conditions for gaining access to the website. Hypertext link 430 connects to web pages that allow a user to learn more about the carOrder.com website, the process of identifying, selecting and buying a car using the carOrder.com website, and the like. Hypertext link 446 connects to web pages that allow other companies to affiliate themselves (and their websites) with the carOrder.com website.

A user gains access to the various functionalities provided by a website (e.g., web page 400) according to an embodiment of the present invention by placing cursor 60 proximate to hypertext link 428 and effectuating a cursor event, hereinafter referred to as activating or selecting a hypertext link. Before activating hypertext link 428, a user must either enter information corresponding to a preexisting account in data entry fields 470 and 475, or register for a new account by activating hypertext link 426. In this manner, a user can be associated with a storage area that is referred to herein as a Virtual Garage®. To restrict access to the aforementioned storage area, a code that corresponds to the user is associated with the Virtual Garage®. The aforementioned code can include, for example, a user-name and a password. To gain access to the user's Virtual Garage®, the user's user-name is entered in data-entry region 470, with the appropriate password entered in data-entry region 475. As is standard with most password security features, password data is not displayed in field 475.

Were a user attempting to gain access to the present invention for the first time, hypertext link 426 would need to be activated to connect to an account registration web page 500, shown in FIG. 5. Account registration web page 500 includes a number of data entry fields 502-526 in which the user enters their personal information. Also included on web page 500 are data entry fields, such as data entry fields 530, 532 and 540-558. Data entry fields 530 and 532 indicate the level of restriction on dissemination of the information provided in data fields 502-526. Information in data fields 540-558 indicates how the user became aware of the carOrder.com website. A number of hypertext links not directly related to registration of a user are also included on web page 500. For example, hypertext links 402-420 and 438-448 are the same as shown on web page 500, discussed above.

Upon acceptance of the registration data entered into the data entry fields 502-526, the user's Virtual Garage® can be accessed by activating hypertext link 420. Activation of hypertext link 420 connects to web page 600, shown in FIG. 6, that includes information concerning products that the user is interested in purchasing. To that end, web page 600 facilitates comparison price shopping by allowing a user to store product-related information concerning multiple products and examine such information. Information concerning various products (in this example) vehicles, can be obtained by activating hypertext link 414, for example. Activating hypertext link 414 connects to web page 700, shown in FIG. 7A, FIG. 7 includes, inter alia, a number of hypertext links that enable access to a database of information related to products such as vehicles. For example, a hypertext link 710 accesses a database concerning information organized by the make and models of vehicles available. A Hypertext link 720 facilitates comparison of vehicles associated with the aforementioned database with other vehicles associated therewith or with information stored by the user in the Virtual Garage®. A Hypertext link 730 accesses the same database, but facilitates searching based upon the features associated with vehicles in the database. Other information is also available to the user, including views of car interiors (accessed using a hypertext link 740), a glossary of terms related to the given type of product offered (accessed using a hypertext link 742) and the sale of used products (accessed using a hypertext link 744).

Figure 7:
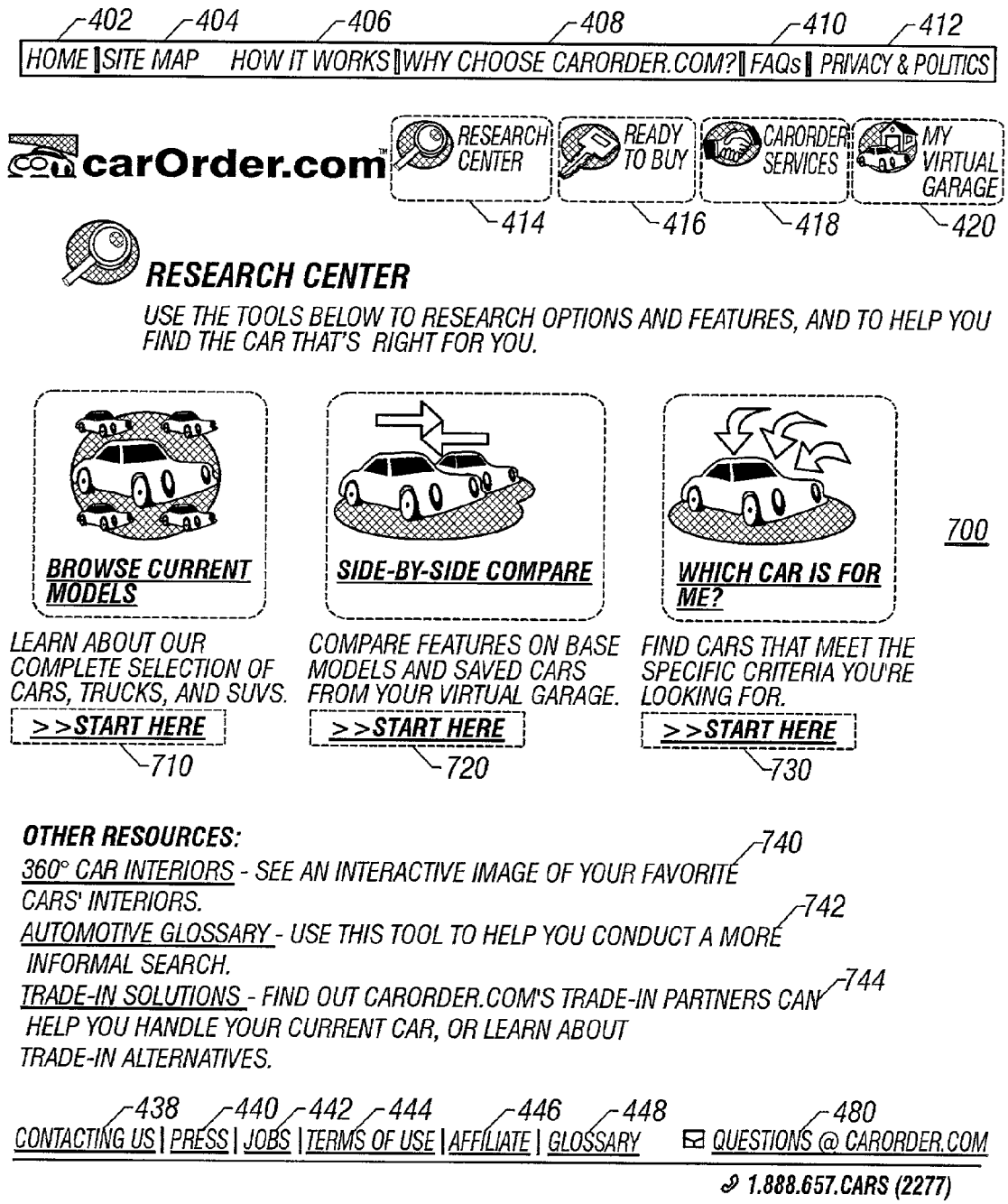
FIG. 7 is a plan view of a web page through which a user can access product-related information according to embodiments of the present invention.

FIGS. 7, 8A and 8B are example screen layouts. Activating hypertext link 710 connects to a web page 800. Web page 800 includes a matrix 810 of hypertext links having the names of various states. Identifying the state in which a user will purchase a product allows the price of the given product (e.g., vehicle) to be accurately determined. In addition, a hypertext link 820 is present on web page 800 that connects to web page 700. Activating one of the hypertext links in matrix 810 connects to web pages having a listing of manufacturers.

FIGS. 8B and 9 are example screen layouts illustrating the manufacturers for which products may be selected and the products available from the given manufacturer, respectively. Activating one of the hypertext links in matrix 810 connects to a web page such as web page 850. Web page 850 includes a matrix 860 of hypertext links having manufacturer names associated with various vehicle manufacturers. In addition, a hypertext link 870 is present on web page 850 that connects to web page 700. Activating one of the hypertext links in matrix 860 connects to web pages having a listing of models of cars fabricated by the manufacture whose name is associated with the hypertext link activated. For example, activating the hypertext link entitled "Jeep" connects to a web page 900. Web page 900 includes a brief description of different models of vehicles sold or manufactured under the "Jeep" trademark in a model selection area 910. In addition to the aforementioned descriptions, model selection area includes hypertext links 920, 922 and 924, which allow the user to learn more about the corresponding product. Also included in model selection area 910 are hypertext links 930, 932 and 934, which allow the user to build a custom configuration of the given product according to the user's desires. In addition, web page 900 includes hypertext links 940 and 950. Hypertext link 940 connects to web page 700 to allow a user to research other products. Hypertext link 950 connects to web page 850 to allow a user to view models of vehicles associated with a different manufacturer.

Referring to FIGS. 9, 10, 11 and 12, hypertext links 920, 922 and 924 allow a user to obtain more specific information concerning particular vehicles sold/fabricated by the manufacturer. For example, hypertext link 922 connects to s web page 1000 that recites more detailed information concerning the Grand Cherokee model of Jeep vehicle in text region 1010 entitled "overview." Web page 1000 also includes various hypertext links that facilitate obtaining additional information concerning the Jeep Grand Cherokee.

These hypertext links include a hypertext link 1020 and a hypertext link 1030. Hypertext link 1020 connects to a web page (a web page 1100) containing information regarding performance characteristics of the Jeep Grand Cherokee. Web page 1100 is similar to web page 1000, excepting text region 1110 concerning the performance characteristics of the Jeep Grand Cherokee. Also similar are the presence of hypertext links 1120 and 1130, which connect to web page 1000 and a web page 1200, respectively. Hypertext link 1120 connects to web page 1000, returning the user to the overview of the Jeep Grand Cherokee. Hypertext link 1130 connects to web page 1200 containing information regarding the various features available on the Jeep Grand Cherokee.

Web page 1200 is similar to web page 1000, excepting recitations concerning the features available on the Jeep Grand Cherokee. Also, unlike web pages 1000 and 1100, web page 1200 includes hypertext links 1220 and 1230 that allow connections to web pages 1000 and 1100, respectively. Hypertext link 1220, as with hypertext link 1120, connects to web page 1000, returning the user to the overview of the Jeep Grand Cherokee. Hypertext link 1230, as with hypertext link 1030, connects to web page 1100, returning the user to the performance characteristics of the Jeep Grand Cherokee.

Web page 1000 also includes a hypertext link 1040 that allows a user to connect to web page 850 to choose information concerning vehicles associated with a different manufacturer. A Hypertext link 1050 allows a user to connect to web page 900 to obtain information related to a different model of the same manufacturer. Activating a hypertext link 1060 allows a user to choose different groups of features for the present model of vehicle that are provided by the manufacturer, referred to as option packages. In this manner, a user is able to "build" a vehicle model having the desired features.

Figure 13:
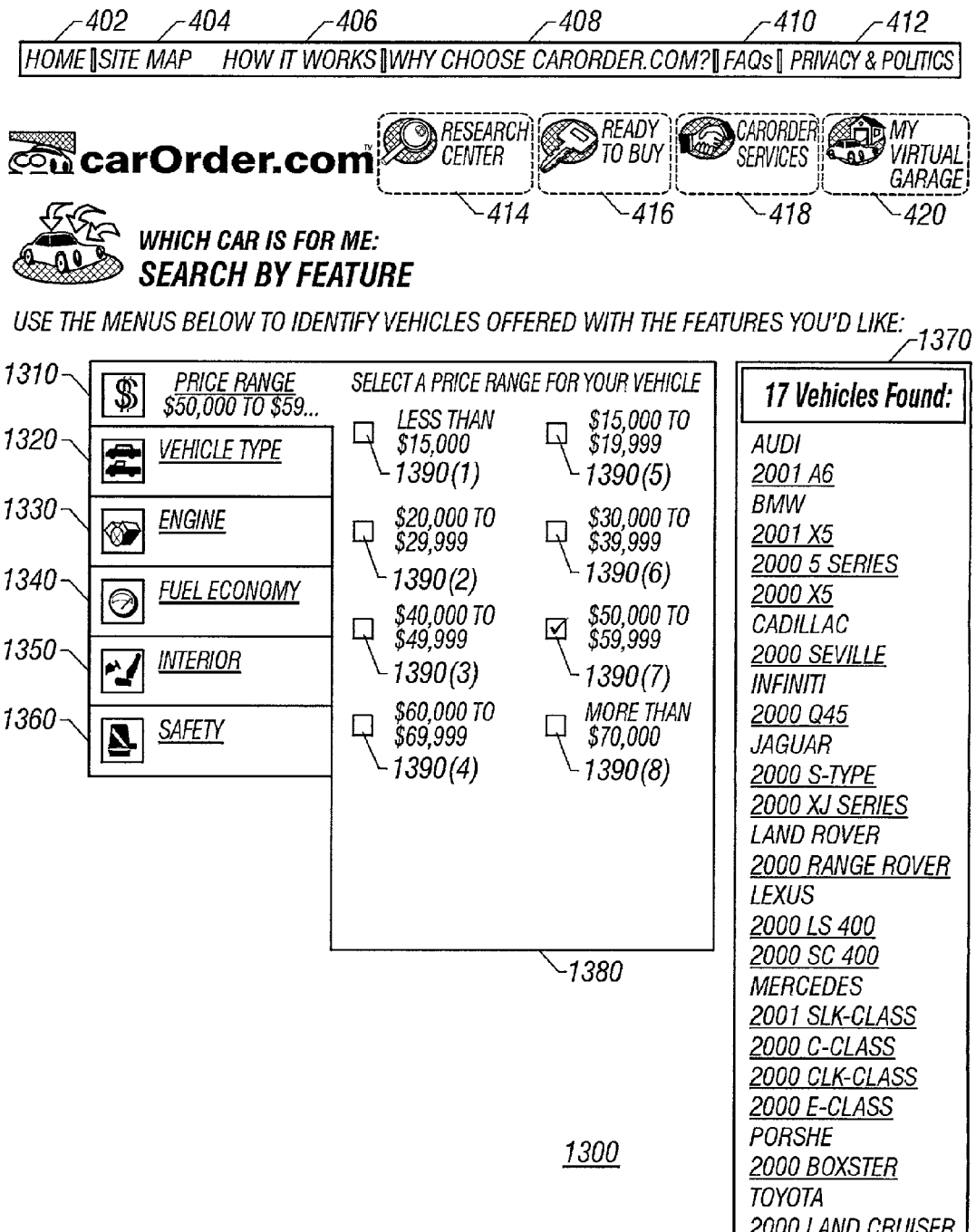
FIG. 13 is a plan view of a web page that allows a user to identify a desired product by price range according to embodiments of the present invention.

Referring to FIGS. 7, 13 and 14, from web page 700, a user can search for a particular vehicle based upon features desired. This functionality is presented to the user as a number of criteria. The user is able to select values, ranges or the like for one or more of these criteria, and in so doing, eliminate products (here, vehicles) from consideration. By performing such a selection process, the user is able to determine which products meet their requirements, as described by the selections made. To that end, hypertext link 730 can be activated, connecting to a web page 1300. Web page 1300 includes a number of hypertext links 1310-1360, which connect to various other web pages containing information concerning various features available on a list of vehicles recited in a column 1370. Web page 1300 also includes a data entry region 1380 having a number of data entry fields 1390(1)-(8). As depicted in FIG. 13, each of data entry fields 1390(1)-(8) corresponds to a range of values. One or more of data entry fields 1390(1)-(8) can be selected to indicate the price of a vehicle in which a user is interested. It will be noted that a pair of numeric entries could be employed to allow a user to indicate the desired price range more exactly. The values, range of values or the like represented by data entry fields such as data entry fields 1390(1)-(8) typically depend on the feature or criteria being selected (e.g., price is typically selected as a range, while a body style is typically selected as a single value). In fact, depending on the feature, a number of such data entry fields may be selectable. For example, one or more of data entry fields 1390(1)-(8) can be selected to indicate the price of a vehicle in which a user is interested. For a range of prices broader than a single range, multiple such ranges (multiple ones of data entry fields 1390(1)-(8)) can be selected. It will be noted that, when one or more price ranges are selected (or de-selected), column 1370 is typically configured to adjust the vehicles listed to reflect those vehicles within the currently-selected price range.

Activating hypertext link 1320 connects to a web page 1400. Web page 1400 is similar to web page 1300, excepting a data entry region 1410. A data entry region 1410 includes a number of data entry fields that correspond to characteristics of a vehicle, such as different options regarding body styles, drive trains and engine locations. It will be noted that, as such options are selected (or de-selected), column 1370 is preferably configured to adjust the vehicles listed to reflect those vehicles having the currently-selected options, and so make web page 1400 more user-friendly. Alternatively, the user can be required to indicate their desire that column 1370 be so updated.

Figure 15:
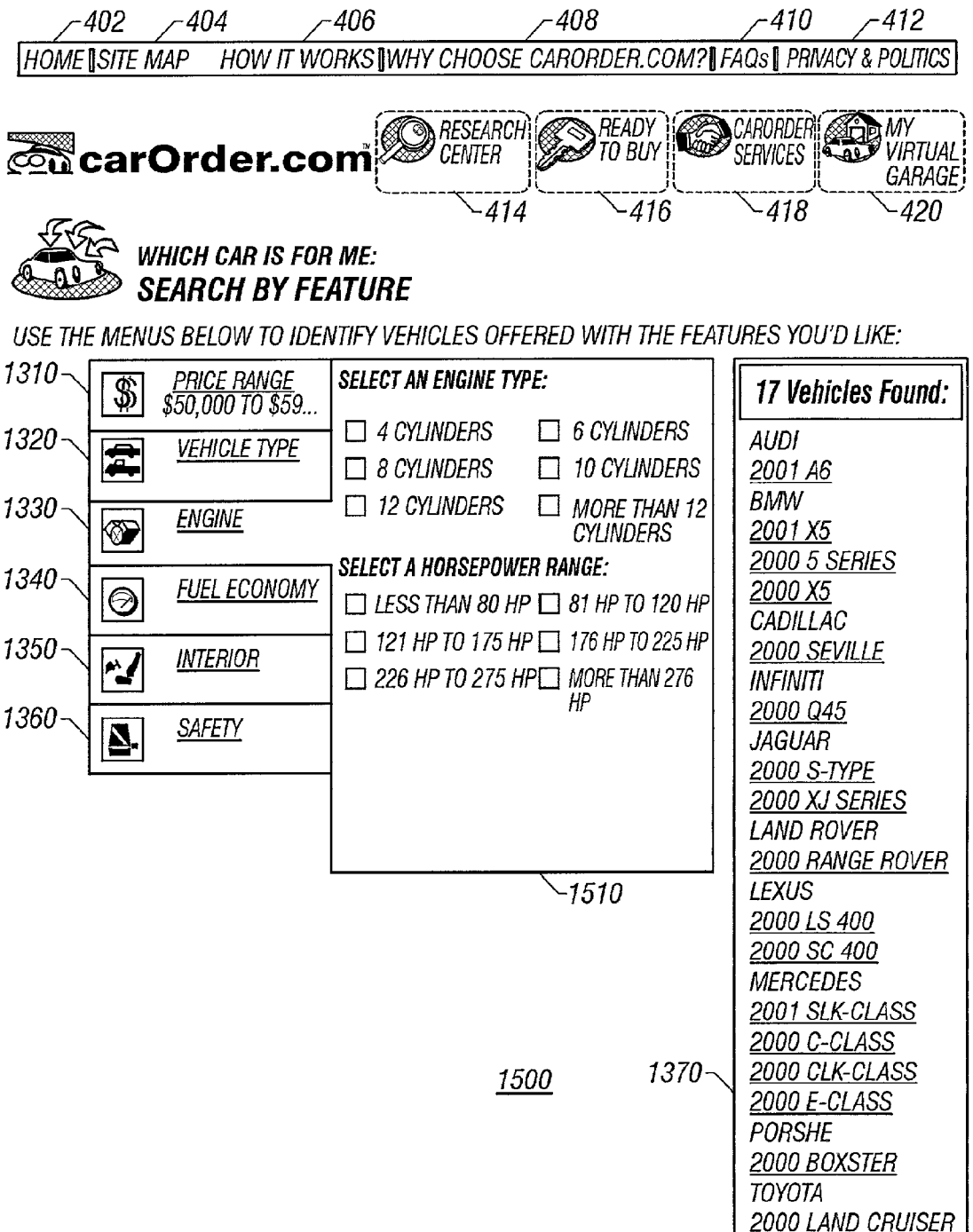
FIG. 15 is a plan view of a web page that allows a user to identify a desired product by engine characteristics according to embodiments of the present invention.

Referring to FIGS. 13 and 15, activating hypertext link 1330 connects to a web page 1500. Web page 1500 is similar to web page 1300, excepting the addition of a data entry region 1510. Data entry region 1510 includes a number of data entry fields that correspond to the characteristics of the engine associated with the desired vehicle. The aforementioned characteristics include the horsepower and the number of cylinders in the given engine. As noted, as such options are selected (or de-selected), column 1370 preferably adjusts the vehicles listed to reflect those vehicles having the currently-selected options.

Figure 16:
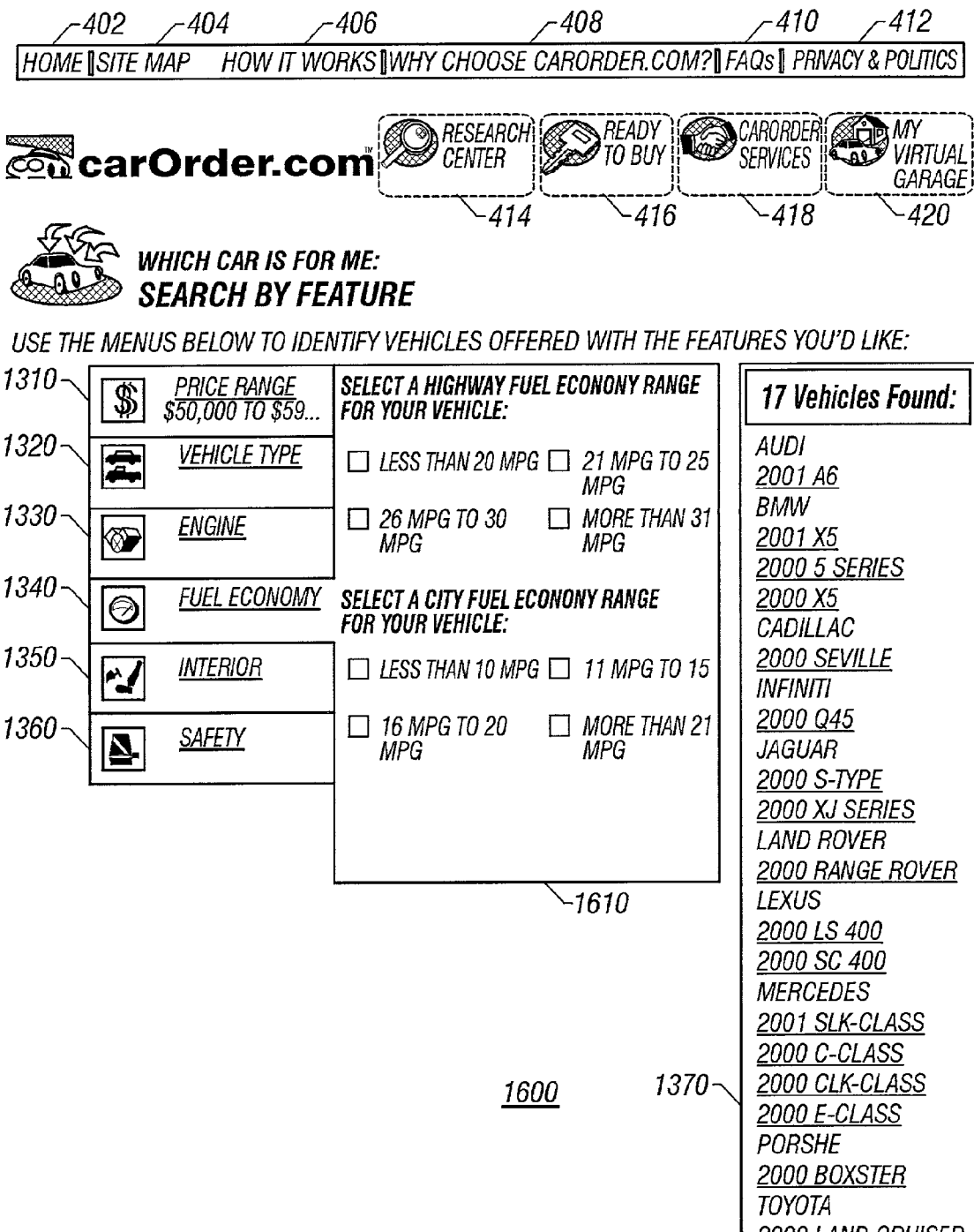
FIG. 16 is a plan view of a web page that allows a user to identify a desired product by fuel economy according to embodiments of the present invention.

Referring to FIGS. 13 and 16, activating hypertext link 1340 connects to a web page 1600. Web page 1600 is similar to web page 1300, excepting the addition of a data entry region 1610 that includes a number of data entry fields that correspond to fuel economy of a vehicle. As a result, a user can select a vehicle based upon the fuel economy desired of the vehicle. For a desired fuel economy range broader than a single range, multiple such ranges (multiple ones of the data entry fields corresponding to the vehicle's desired fuel economy) can be selected. As noted, as such fuel economy requirements are selected (or de-selected), column 1370 preferably adjusts the vehicles listed to reflect those vehicles having the desired fuel economy.

Figure 17:
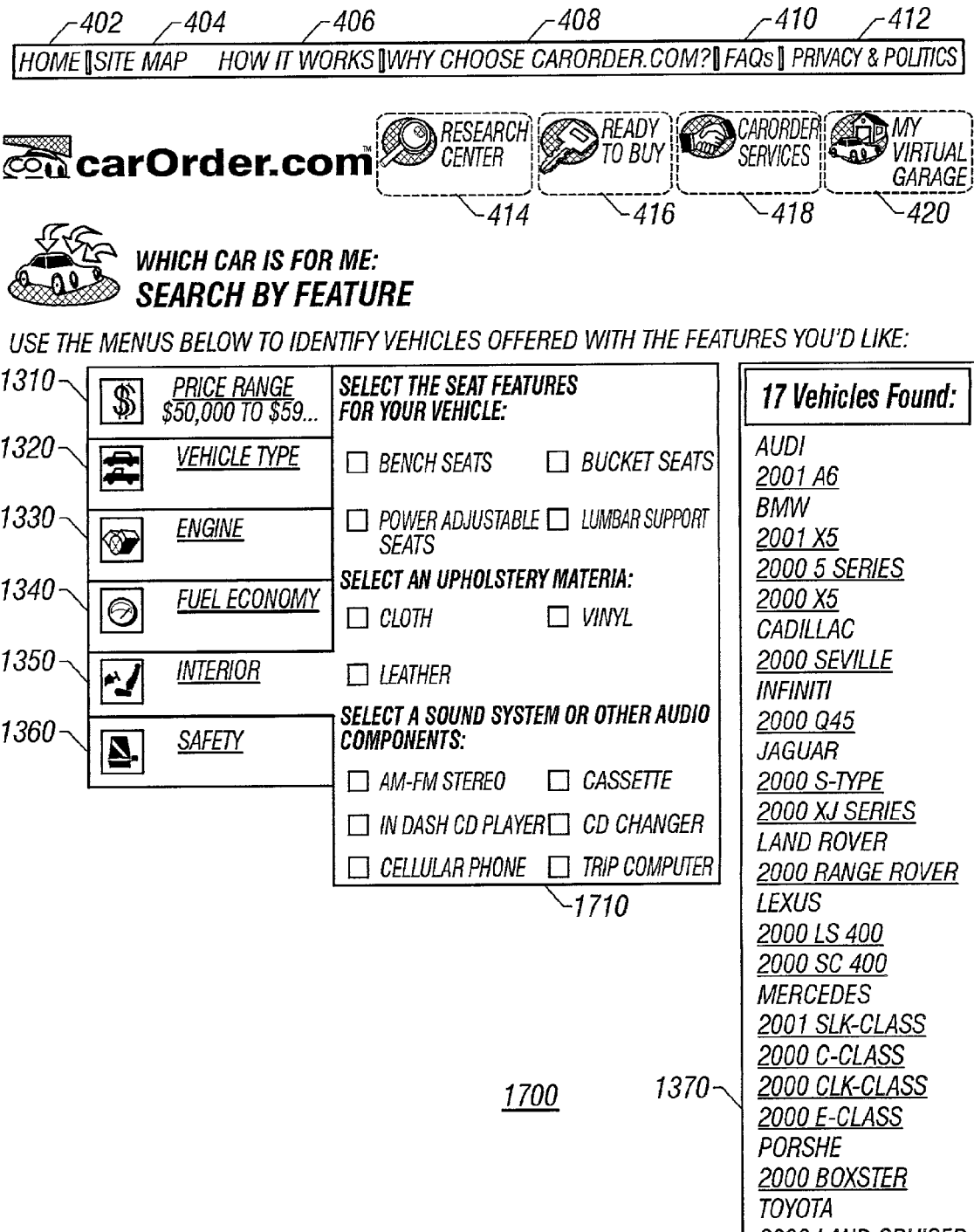
FIG. 17 is a plan view of a web page that allows a user to identify a desired product by interior characteristics according to embodiments of the present invention.

Referring to FIGS. 13 and 17, activating hypertext link 1350 connects to web page 1700. Web 1700 is similar to web page 1300, excepting the addition of a data entry region 1710 which includes a number of data entry fields that correspond to the characteristics a vehicle's interior. The aforementioned characteristics can include the type of seats included with the vehicle, e.g., bench or bucket seats, as well as the upholstery thereof. Additionally, the type of sound system can be chosen from data entry regions in data entry region 1710. As noted, as such options are selected (or de-selected), column 1370 preferably adjusts the vehicles listed to reflect those vehicles having the currently-selected options.

Figure 18:
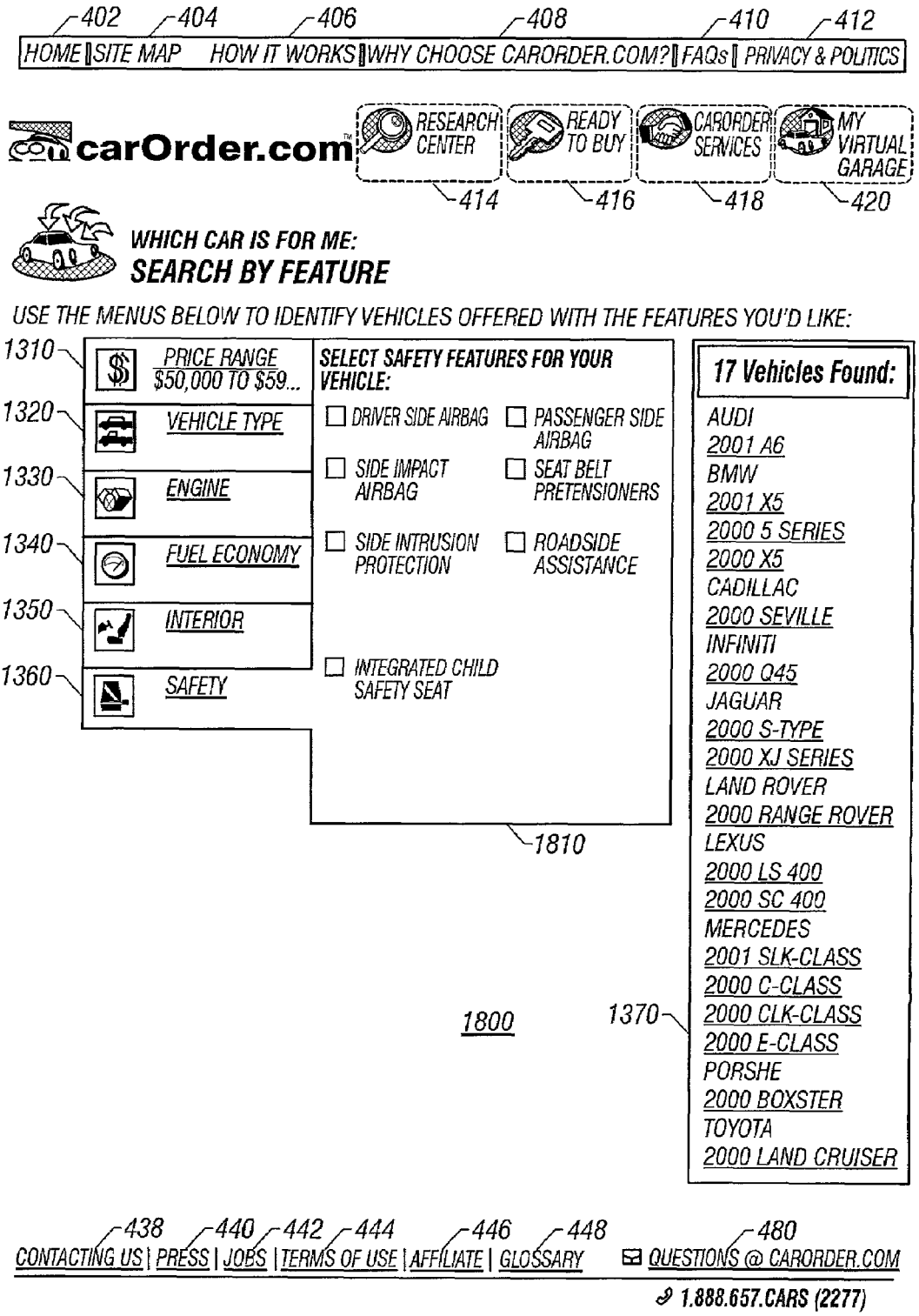
FIG. 18 is a plan view of a web page that allows a user to identify a desired product by safety features according to embodiments of the present invention.

Referring to FIGS. 13 and 18, activating hypertext link 1360 connects to a web page 1800. Web page 1800 is similar to web page 1300, excepting the addition of a data entry region 1310 which includes a number of data entry fields that correspond to the safety characteristics a vehicle. This allows selecting vehicles based upon the safety restraint systems associated therewith, e.g., driver side airbag, integrated child safety seat, roadside assistance and the like. The aforementioned characteristics can include the type of seats included with the selected vehicle, (e.g., bench or bucket seats), upholstery and the like. Additionally, the type of sound system can be selected using data entry regions in data entry region 1310. As noted, as such options are selected (or de-selected), column 1370 preferably adjusts the vehicles listed to reflect those vehicles having the currently-selected options.

Figure 19:
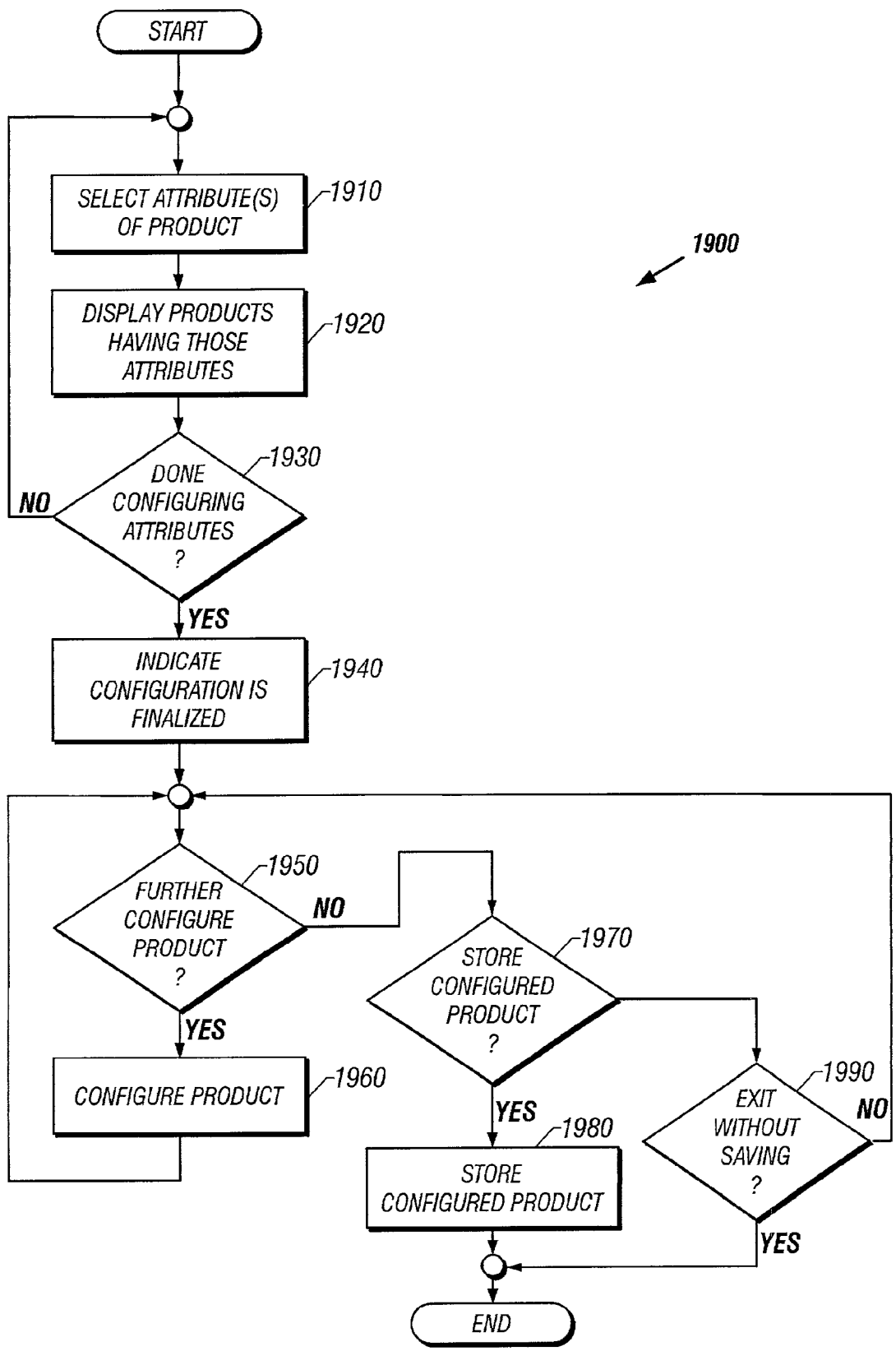
FIG. 19 is a flow diagram illustrating a product identification process according to embodiments of the present invention.

FIG. 19 is a flow diagram illustrating a needs analysis process 1900, in which a selection of cars is presented to the user based on analysis of that user's needs (i.e., a needs analysis). The process begins with the user's selection of the options, features or the like that are desired in the given product (e.g., vehicle) (step 1910). These options appear in web page 1300, for example, as data entry regions 1390(1)-(8). By selecting one or more of data entry regions 1390(1)-(8), the user is able to identify the user's desired price range, for example. If the user wishes to select a price range of less than $15,000, for example, the user selects data entry region 1390(1) (i.e., makes data entry region 1390(1) the subject of a cursor event, as described previously). The products meeting the given requirements (i.e., having the desired feature(s)) are then displayed (step 1920). As noted, this is preferably done as the user makes such selections. Thus, for example, a user can enter such requirements using the respective data entry regions of web pages 1300-1800. By doing so, the user narrows the field of possible product choices available to them, and so simplifies the task of selecting a product for purchase. The user is free to reconfigure the product, or may proceed to further configuration steps or to saving the product configuration (step 1930).

Having settled on a given product configuration (step 1930), the user may elect to further configure the product or store the configured product. If the user desires to further configure the product (step 1950), the user then navigates to web pages that allow such configuration (step 1960). These web pages can provide further detail, allowing the user to use the configured product as a starting point. The user can then select various features for the given product. Some of the features presented for selection by the user may not appear in the features presented by web pages 1300-1800, and so "fine tuning" of the product's configuration can be accomplished by the use of such web pages. Once the product has been configured to the user's satisfaction (either via, e.g., web pages 1300-1800, or through further configuration), the user can store the configured product, if desired (steps 1970 and 1980). Otherwise, the user can decide to exit without saving the configured product, or re-configure the product (step 1990).

It will be noted that an architecture such as that described herein allows such product configurations to be generated based on general criteria, such as price range, engine characteristics, and other such criteria. This is possible because certain corresponding configurations are typically defined for at least some of the products offered, in order to support the ability to generate configurations using such general criteria. It will also be noted that an architecture such as that described herein also allows the configuration information thus generated to be persisted to other functions within the architecture (e.g., a configuration engine that allows the user to vary certain equipment features of the given vehicle, in the process of configuring a vehicle for evaluation, further configuration, storage (e.g., the storage of a configured vehicle in the user's Virtual Garage®), purchase and the like). Moreover, this architecture prevents the generation of product configurations that are not feasible, not allowed or offered by the seller or restricted in some other manner.

As noted, FIG. 19 depicts a flow diagram illustrating a selection process according to one embodiment of the present invention. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of FIG. 19 may be executed by a module (e.g., a software module) or a portion of a module or a computer system user using, for example, a computer system such as the storage router previously mentioned, or a similar network element, as well as a computer system such as computer system 10. Thus, the above described method, the operations thereof and modules therefore may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

The software modules described herein may be received by such a computer system, for example, from computer readable media. The computer readable media may be permanently, removably or remotely coupled to the computer system. The computer readable media may non-exclusively include, for example, any number of the following: magnetic storage media including disk and tape storage media. optical storage media such as compact disk media (e.g., CD-ROM, CD-R, etc.) and digital video disk storage media. nonvolatile memory storage memory including semiconductor-based memory units such as FLASH memory, EEPROM, EPROM, ROM or application specific integrated circuits. volatile storage media including registers, buffers or caches, main memory, RAM, etc. and data transmission media including computer network, point-to-point telecommunication, and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein.

Figure 20:
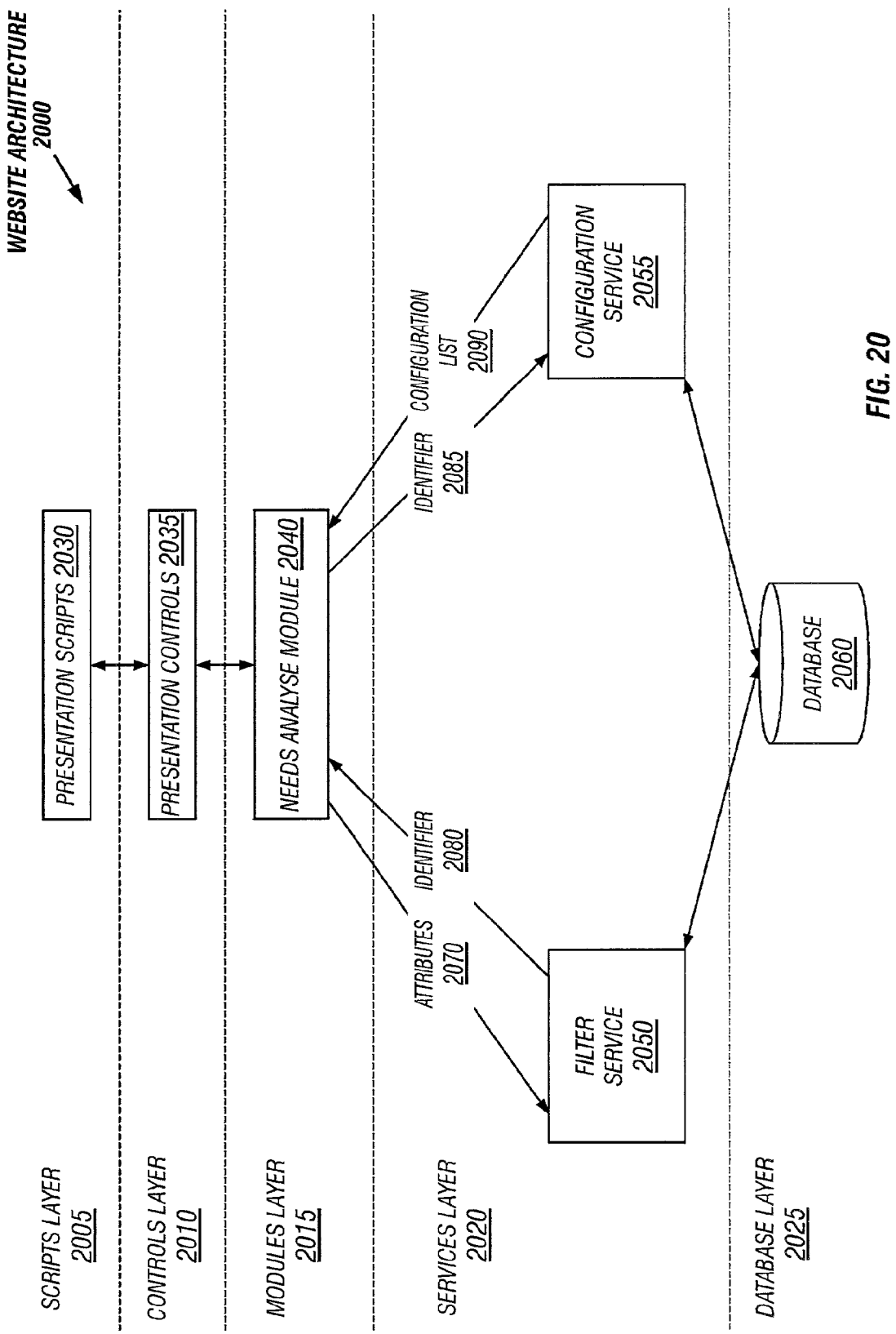
FIG. 20 is a block diagram illustrating a software architecture according to embodiments of the present invention.

FIG. 20 is a block diagram illustrating a software architecture (specifically, a website architecture 2000) including the various layers and modules that can be used to create a website such as that depicted in FIGS. 3-18 herein. Website architecture 2000 includes a scripts layer 2005, a controls layer 2010, a modules layer 2015, a services layer 2020 and a database layer 2025. Scripts layer 2005 includes a set of presentation scripts 2030, which may be implemented using a Java scripting language such as JSP, for example. Similarly, controls layer 2010 includes a set of presentation controls 2035. Presentation controls 2035 provide functionality that interoperates with presentation scripts 2030 to provide the user interface presented to a user accessing a website supported by a website architecture such as website architecture 2000. The functionality provided by presentation controls 2035 includes management of HTML controls, lists, links and buttons that provide the functionality presented by such a website.

Typically, controls have no state, except that which is needed for the actual control itself (e.g., identity). Modules layer 2015 includes a needs analysis module 2040, among other modules. In general, modules are used for tasks such as caching, cross-module communication and management of communications with the various services to which the given module belongs, which includes the management of object caching and the servicing of objects. As its name implies, needs analysis module 2040 provides the functionality necessary to analyze available products (e.g., vehicles) based on a user's indicated needs and so to support the functionality presented as web pages 1300, 1400, 1500, 1600, 1700 and 1800.

Services layer 2020 includes a filter service 2050 and a configuration service 2055. Services layer 2020 acts as an interface between modules layer 2015 and database layer 2025, and provides functionality such as data persistence and data preparation, allowing interaction with other functions within the architecture, such as remote resources. It will be noted that this persistence allows the configuration information generated during needs analysis to be made available to other functions within the architecture (e.g., further configuration or storage) without further user intervention (e.g., without requiring a user to re-enter the configuration information thus generated). A services layer such as services layer 2020 also allows for the persistence of the respective information for each of the separate functionalities represented by each service therein, as well as control and management of the given service's data. Typically, a service has no state associated therewith.

In supporting the functionality provided by needs analysis module 2040, filter service 2050 and configuration service 2055 respond to requests for information from needs analysis module 2040 based on information provided by needs analysis module 2040. Such information is provided from the one or more databases of database layer 2025 (exemplified by a database 2060, which is also referred to herein as a product information database). Database layer 2025 (via database 2060) effects the actual storage of the data employed by the various functions provided by website architecture 2000. In providing such support, database 2060 provides services such as filter service 2050 and configuration service 2055 with the data necessary for these services to respond to requests from needs analysis module 2040.

For example, a user can send attribute information to needs analysis module 2040 as an attribute selection, using presentation scripts 2030 and presentation controls 2035. Needs analysis module 2040 then provides the attribute information (depicted in FIG. 20 as a set of attributes 2070) to filter service 2050, in order to allow a search of database 2060 based on the attribute information provided (i.e., attributes 2070). Thus, a user is presented with web pages 1300-1800 by presentation scripts 2030 and presentation controls 2635, as well as the underlying functionality provided by needs analysis module 2040. When the user selects a given option (e.g., a price range of less than $15,000) using a control (e.g., data entry field 1390(1)), information representing this selection is provided by needs analysis module 2040 to filter service 2050 as attributes 2070. Filter service 2050 then uses this information to query database 2060 as to products (e.g., vehicles) that meet the user's requirements. Assuming one or more configurations match attributes 2070, the product identifiers for such vehicle configurations (exemplified by identifiers 2080) are passed from filter service 2050 to needs analysis module 2040, having been gleaned from database 2060 by the filtering operation (i.e., search). This is the case where, for example, a user wishes to identify vehicles meeting that user's stated criteria using the needs analysis techniques described herein. It will be noted that this and other requests discussed herein are in response to user actions presented via scripts layer 2005 (e.g., presentation scripts 2030) and controls layer 2010 (e.g., presentation controls 2035).

Alternatively, a user can send product identifier information to needs analysis module 2040 as a product identifier selection, using presentation scripts 2030 and presentation controls 2035. Needs analysis module 2040 then supplies the product identifier information (depicted in FIG. 20 as an identifier 2085) to configuration service 2055, in order to identify a list of configurations that correspond to the given identifier. This is the case, for example, where a user desires to see a list of possible configurations or equipment options available for a given vehicle. Once configuration service 2055 has received identifier 2085, configuration service 2055 accesses database 2060 to identify those parts (e.g., vehicle configurations) having an identifier matching identifier 2085. Once the search of database 2060 is complete, configuration service 2055 supplies a configuration list 2090 to needs analysis module 2040, for subsequent presentation to the user via scripts layer 2005 and controls layer 2010. Configuration list 2090 can include, for example, information regarding allowable combinations of features for a given product, a list of features available for a given product, or the like. Configuration service 2055 can thus be used, for example, to determine if a vehicle configuration meeting a user's needs exists or if a given vehicle is available with a given feature.

Figure 21:
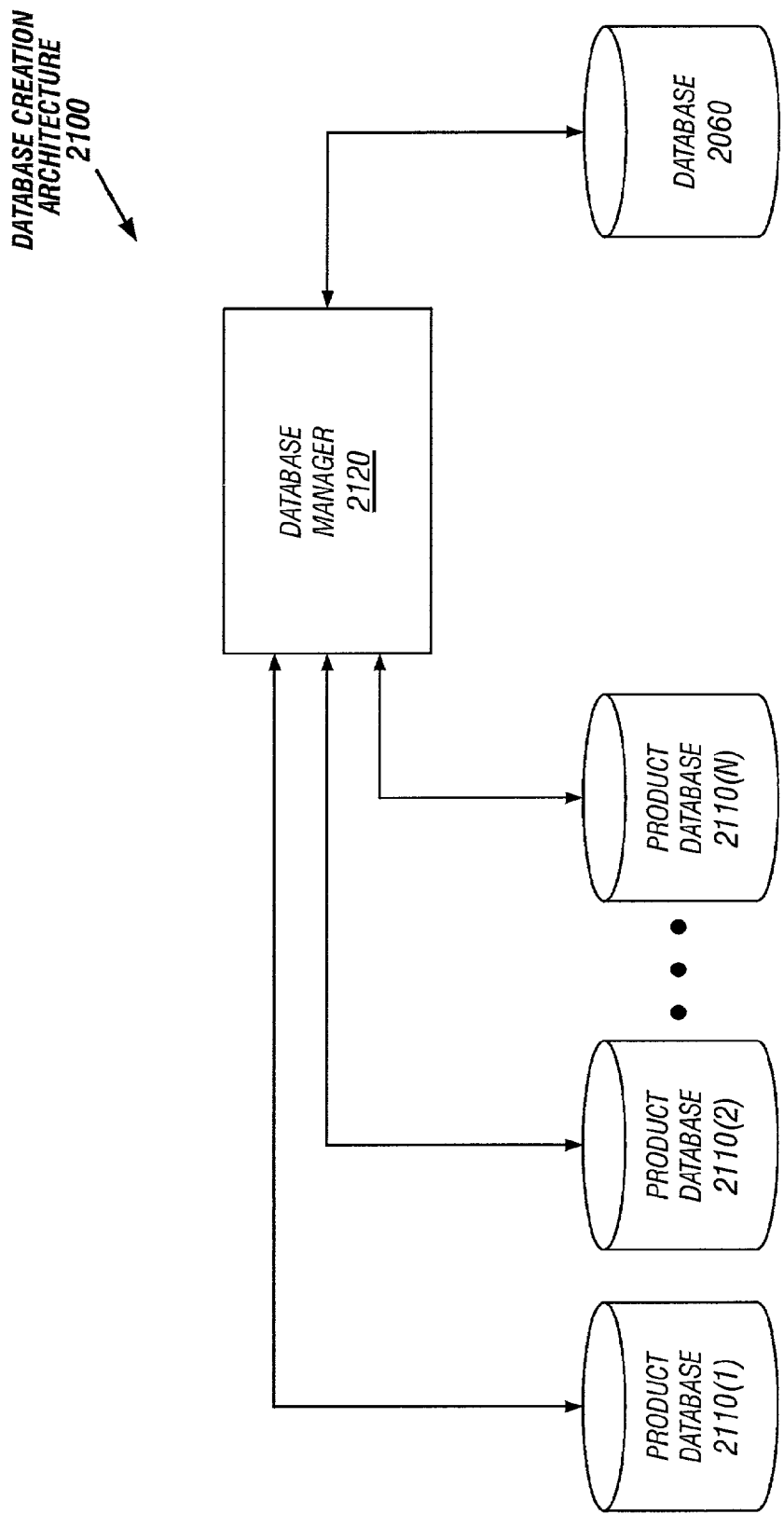
FIG. 21 is a block diagram illustrating the creation of a database according to embodiments of the present invention.

FIG. 21 is a block diagram illustrating the creation of a database such as database 2060 (referred to herein as a database creation architecture 2100). This is, in effect, a pre-processing step in which a (potentially large) number of possible configurations are enumerated for inclusion in database 2060. In the case of vehicles, as with many commercially-available products, a relatively large number of permutations can exist when considering various features that may be available for such products. With a large number of features, and so possible combinations, the problem of quickly presenting a given configuration becomes one of a combinatorial nature. To avoid (or at least lessen) such effects, embodiments of the present invention employ a pre-processing operation in creating database 2060. Thus, for each product (e.g., vehicle) included in database 2060, a separate database is used. Such databases are exemplified in FIG. 21 by product databases 2110(1)-(N). Product databases 2110(1)-(N) include information regarding the features of each such product. For example, each one of product databases 2110(1)-(N) can include information regarding the available equipment options for a given make and model of a vehicle. Rules governing allowable combinations of such features can also be included in product databases 2110(1)-(N). For example, in the context of vehicle equipment configurations, certain combinations of attributes are either not possible or not allowable. This might be the case, for example, where two equipment options where either mutually exclusive (e.g., cloth upholstery and leather upholstery) or where the manufacturer does not permit such combinations (e.g., a sun-roof in a base model).

With regard to the present invention, the ability to discern allowable feature combinations is important because such capabilities preclude the presentation of products that fail to meet all the user's requirements in a single model. For example, a product, such as a vehicle, may be offered in a number of models. One of the product's models may meet one user requirement, while another of the product's models may meet another of the user's requirements. Thus, without knowledge of allowable feature combinations, a needs analysis process could present a product as meeting both requirements, while in fact a model meeting both requirements would not exist. By controlling which feature combinations are allowable, embodiments of the present invention avoid generating spurious results when performing needs analysis.

Such rules can also enumerate the precedence with which product features are satisfied when generating a comparable product (e.g., vehicle type, price, engine characteristics, trim features and so on). Other such situations will be readily apparent to one of skill in the art. Thus, a database manager 2120 is employed to process the information in product databases 2110(1)-(N) into (allowable) configurations for entry into database 2060. Moreover, maintenance of a given product's information is simplified. This is because the product's information is more accessible (because the product information is stored separately from the configuration and attribute information stored in database 2060) and quickly accessed (due to the relatively small database in which the product's information is stored).

Database manager 2120 can be configured to perform this translation in a number of different ways. For example, database manager 2120 can generate the set of feature combinations that users are likely to desire from the information in product databases 2110(1)-(N) for entry into database 2060. Alternatively, database manager 2120 can be configured to generate all possible product configurations from product databases 2110(1)-(N), for entry into database 2060. Another possible scenario is to have research manager 2120 generate a minimal set of configurations from product databases 2110(1)-(N), and then add configurations dynamically to database 2060 as such configurations are requested by users of the websites employing website architecture 2000.

Figure 22A:
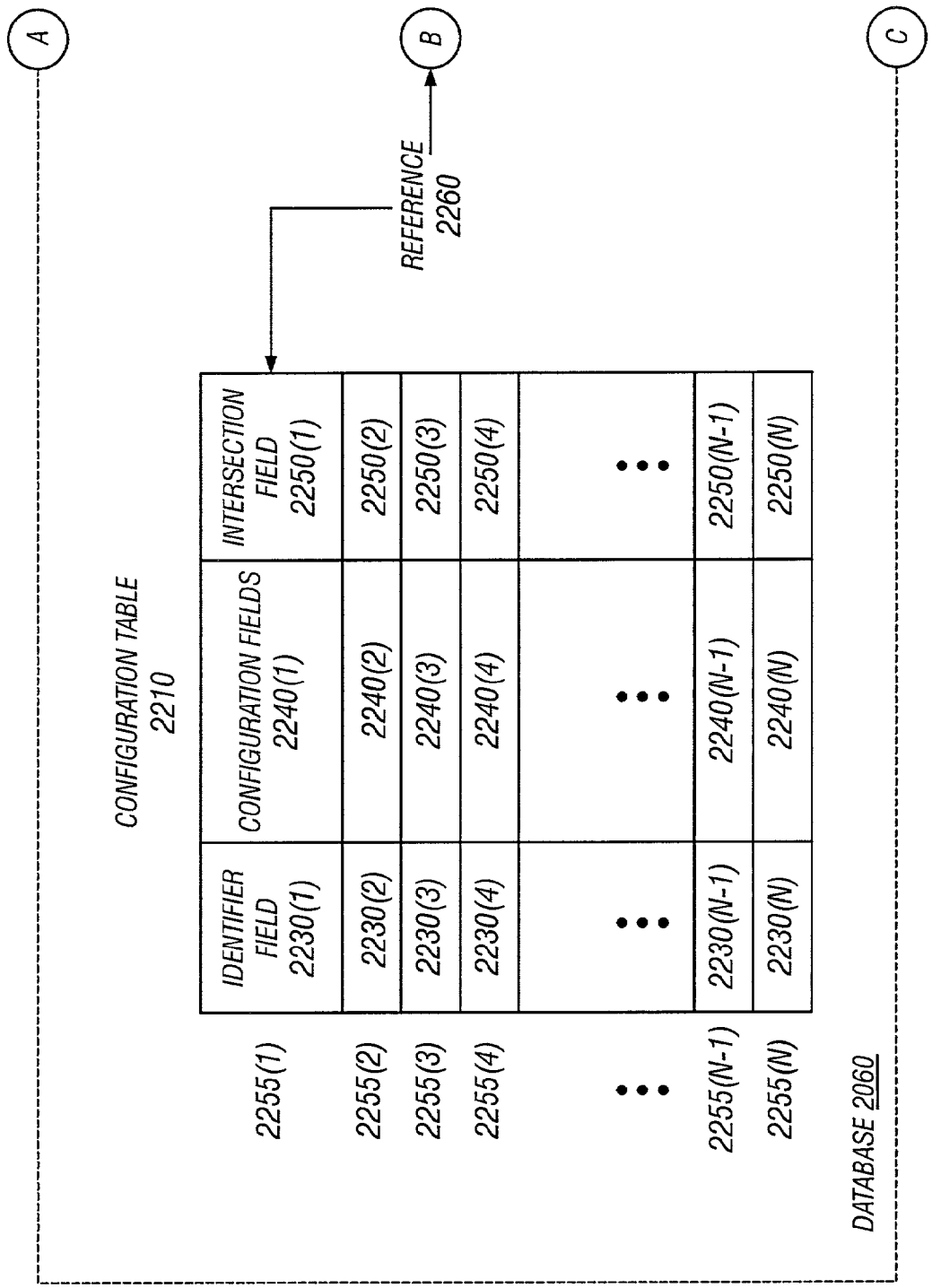
FIG. 22A and FIG. 22B, referred to herein generally as FIG. 22, illustrate an example of a database structure that can be used in the database of FIG. 21.
Figure 22B:
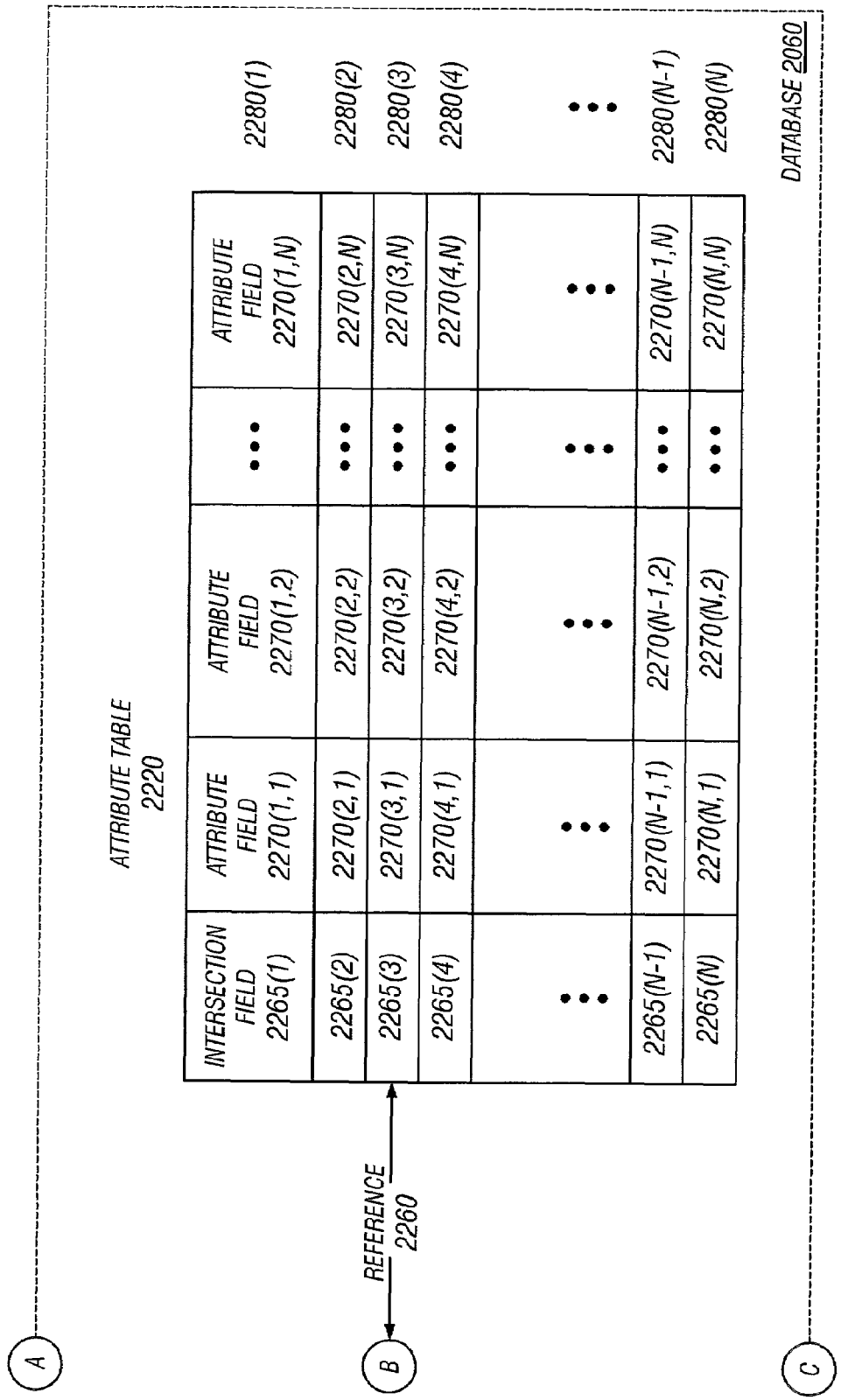

FIG. 22 illustrates an example of a database structure that can be used in database 2060. This database structure (exemplified in FIG. 22 by a database structure 2200) includes information regarding various product configurations (e.g., vehicle equipment configurations) and the attributes that make up such configurations, for example. This information can be held in a configuration table 2210 and an attribute table 2220, respectively, which are simply example representations of structures which may be used to maintain such information. Configuration table 2210 includes identifier fields 2230(1)-(N), configuration fields 2240(1)-(N) and intersection fields 2250(1)-(N). A record in configuration table 2210 (exemplified by one of configuration table records 2255(1)-(N)) includes a corresponding one of each of identifier fields 2230(1)-(N), configuration fields 2240(1)-(N) and intersection fields 2250(1)-(N). Each of configuration table records 2255(1)-(N) corresponds to one of the configurations created by database manager 2120 from a corresponding one of product data bases 2110(1)-(N). In other words, the configuration represented by the corresponding one of configuration fields 2240(1)-(N) is generated from the product database corresponding to the given product using the information and rules contained in the corresponding one of product databases 2110(1)-(N). Thus, each configuration generated from product databases 2110(1)-(N) by database 2120 appears in configuration table 2210 as one of configuration fields 2240(1)-(N) and can be accessed as such using the corresponding one of identifier fields 2230(1)-(N) for example. Also provided as part of configuration table 2210 are intersection fields 2250(1)-(N). Intersection fields 2250(1)-(N) allow access to attribute table 2220 from a given one of configuration table records 2255(1)-(N).

Attribute table 2220 includes intersection fields 2265(1)-(N) and a number of attribute fields (depicted in FIG. 22 by attribute fields 2270(1,1)-(N,N)) that are broken up into a set of records (exemplified by attribute table records 2280(1)-(N)). While configuration table 2210 maintains information regarding various configurations of products and their features, attribute table 2220 maintains corresponding information with regard to the actual attributes of the product. Intersection fields 2265(1)-(N) allow access to attribute table 2220 from a given one of configuration table records 2255(1)-(N). Records in configuration table 2210 and attribute table 2220 reference one another via references such as a reference 2260. For example, configuration table record 2255(1) is referenced to attribute table record 2280(3) using information held in intersection field 2250(1), and attribute table record 2280(3) is referenced to configuration table record 2255(1) using information held in intersection field 2265(3). This cross-referencing is depicted in FIG. 22 by reference 2260. Thus, searching configurations using attributes, or vice versa (searching attributes using configurations (e.g., configuration IDs)) can be performed.

It will be noted that the references between configuration table 2210 and attribute table 2220 are bi-directional (e.g., reference 2260). This allows the a process according to embodiments of the present invention to be performed in support of the searching of database 2060, based on the user's needs (i.e., needs analysis or sorting products by features). Such functionality appears in FIG. 20 as filter service 2050, which receives attributes 2070 from needs analysis module 2040 and uses these attributes to access information in database 2060, as follows. Upon receiving attributes 2070, filter service 2050 uses the attributes therein to access attribute table 2220 by matching (in some way) one or more of attribute fields 2270(1,1)-(N,N) in order to identify those of attribute table records 2280(1)-(N) which are desired. Once the desired attribute table records have been identified, each corresponding reference is used to access a given one of configuration table records 2255(1)-(N). Having identified desired ones of configuration table records 2255(1)-(N), information stored in each one of identifier fields 2230(1)-(N) corresponding to the desired set of attributes can then be provided by filter service 2050 to needs analysis module 2040 (e.g., identifier 2080). This corresponds to filter service 2050 passing identifier 2080 to needs analysis module 2040. Using such an approach, in the situation where a given product (e.g., a vehicle listed in column 1370 of web pages 1300-1800) represents multiple configurations (e.g., models), the product's listing implies that at least one model of the given product exists that meets the user's requirements.

Another permutation supported by database structure 2200 is depicted in FIG. 20 in the provision of identifier 2085 by needs analysis module 2040 to configuration service 2055. In this situation, identifier 2085 is used by configuration service 2055 in accessing database 2060 in order to generate a list of configurations matching identifier 2085 (depicted in FIG. 20 in the response by parts service 2055 as configuration list 2090). In this scenario, identifier 2085 is used to identify one or more of configuration table records 2255(1)-(N) corresponding to the desired configurations by matching identifier 2085 to one or more corresponding ones of identifier fields 2230(1)-(N), and so to access corresponding ones of configuration fields 2240(1)-(N). Once the desired configuration fields have been identified, this information is passed by configuration service 2055 to needs analysis module 2040 as configuration list 2090.

Figure 23:
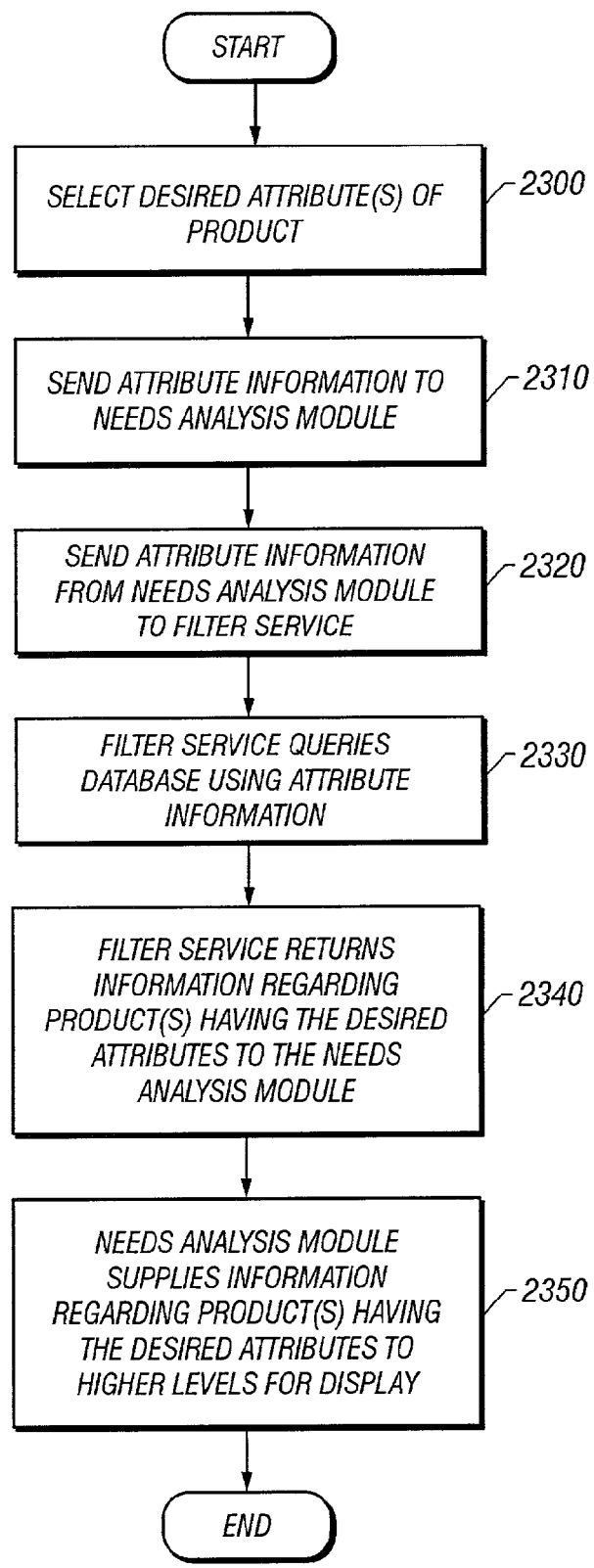
FIG. 23 is a flow diagram illustrating a product identification process based on product attributes (e.g., features) that occurs in a software architecture according to embodiments of the present invention.

FIG. 23 is a flow diagram illustrating an example of the operation of website architecture 2000, when used to generate product configurations from selected attributes (as depicted in FIGS. 13-18). The process begins with the user entering attribute selections (e.g., such as those described in relation to FIGS. 13-18) (step 2300). This functionality is provided by presentation scripts 2030 and presentation controls 2035, for example, or other, comparable software residing in scripts layer 2005 and controls layer 2010. This attribute information is then made available to needs analysis module 2040 (step 2310). Next, the attribute information is sent from needs analysis module 2040 to filter service 2050 as attributes 2070 (step 2320). Filter service 2050 then queries database 2060 using the attribute information supplied (step 2330). Next, filter service 2050 returns information to needs analysis module 2040 regarding the product(s) identified as having the desired attributes (step 2340). Needs analysis module 2040 then supplies the information regarding product(s) having the desired attributes to higher levels for display (e.g., presentation scripts 2030 and presentation controls 2035, or other such functionality provided by scripts layer 2005 and controls layer 2010) (step 2350).

Figure 24:
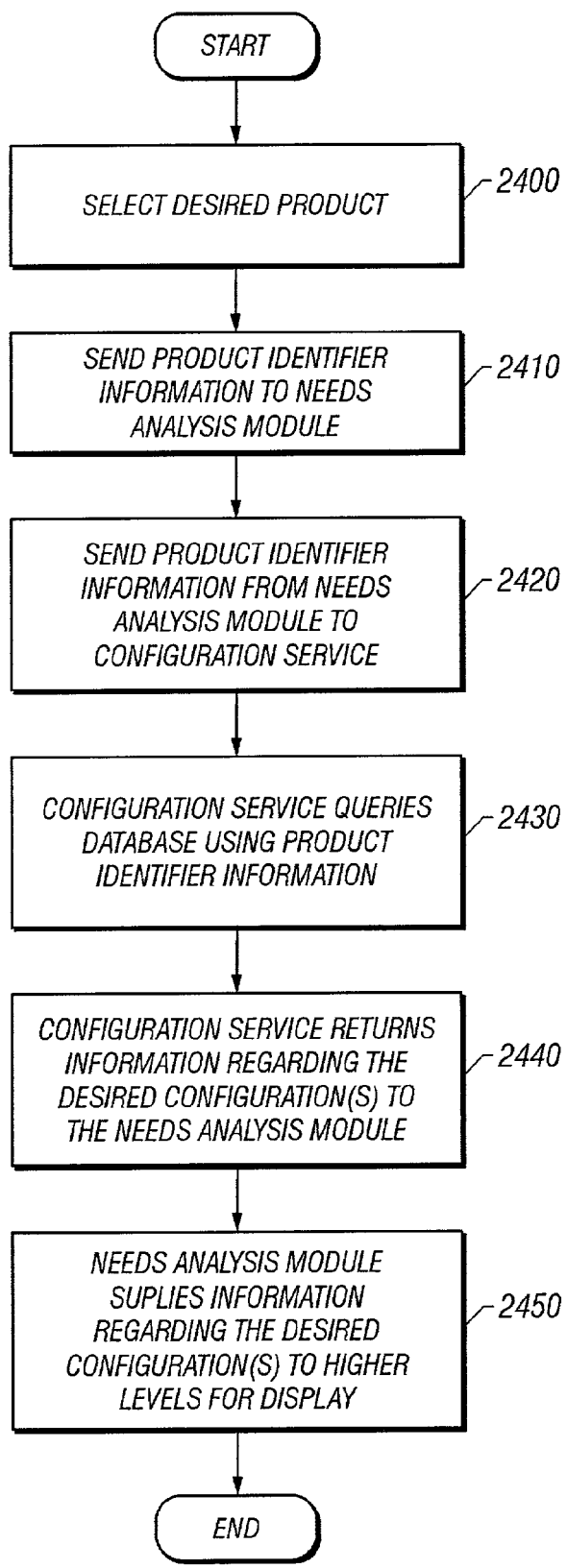
FIG. 24 is a flow diagram illustrating a product identification process based on a product identifier that occurs in a software architecture according to embodiments of the present invention.

FIG. 24 is a flow diagram illustrating an example of the operation of website architecture 2000, when used to identify product features (i.e., attributes). The process begins with the user entering one or more product or product configuration selections (step 2400). This functionality is provided by presentation scripts 2030 and presentation controls 2035, for example, or other, comparable software residing in scripts layer 2005 and controls layer 2010. This product identifier information is then made available to needs analysis module 2040 (step 2410). Next, the product identifier information is sent from needs analysis module 2040 to configuration service 2055 as identifier 2085 (step 2420). Configuration service 2055 then queries database 2060 using the product identifier information supplied (step 2430). Next, configuration service 2055 returns information to needs analysis module 2040 regarding the product's (or products') configuration(s) identified as having the selected product identifier(s) (step 2440). Needs analysis module 2040 then supplies the information regarding these configurations to higher levels for display (e.g., presentation scripts 2030 and presentation controls 2035, or other such functionality provided by scripts layer 2005 and controls layer 2010) (step 2450).

Figure 25:
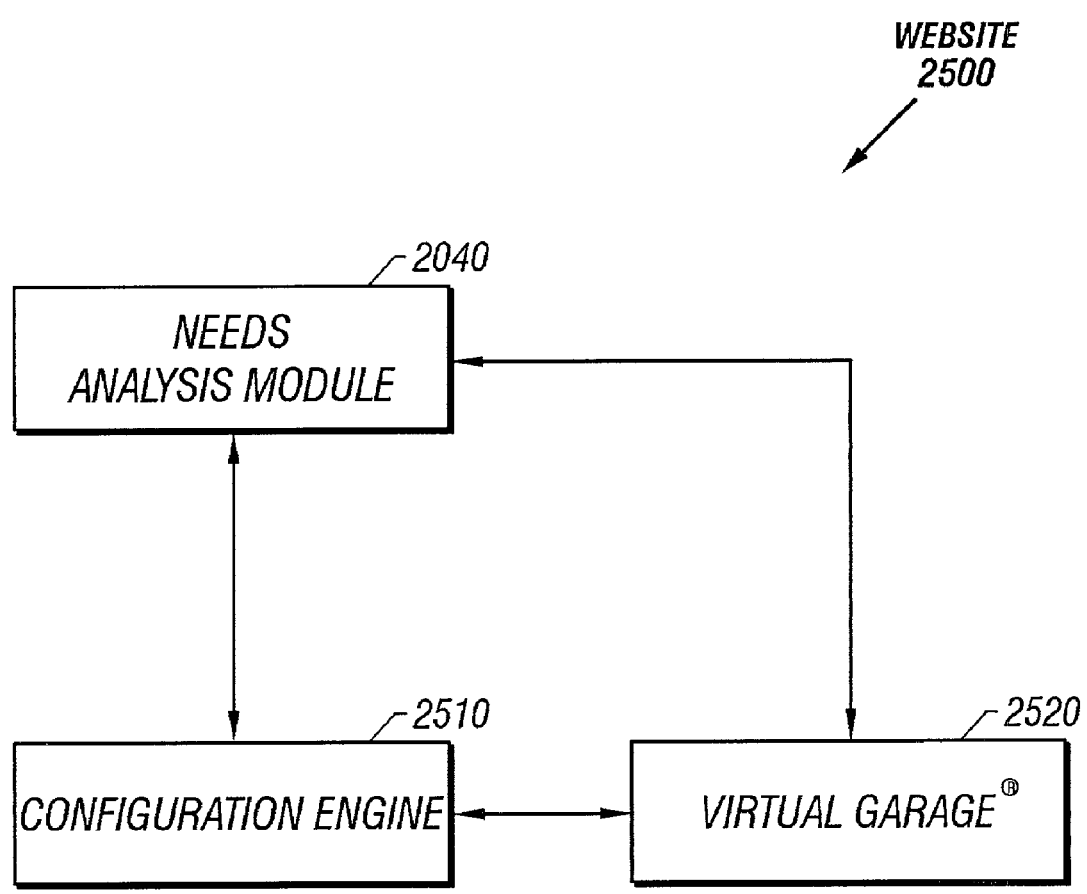
FIG. 25 is a block diagram illustrating an example of a website according to embodiments of the present invention.

FIG. 25 is a block diagram illustrating an example of website 2500 employing website architecture 2000. In addition to needs analysis module 2040, website 2500 includes a configuration engine 2510 and a Virtual Garage® 2520. Configuration engine 2510 allows a user to configure a vehicle (typically are a finer level of detail than that of needs analysis module 2040), while Virtual Garage® 2520 permits the user to store a configured vehicle. In addition to storing a vehicle configured using configuration engine 2510, Virtual Garage® 2520 is also configured to accept such information from needs analysis module 2040. Moreover, Virtual Garage® 2520 can accept such information without user intervention (e.g., requiring a user to re-enter configuration information regarding the given vehicle). This ability is supported by the data persistence discussed previously, and so entails the functionalities provided by services layer 2020. Once stored in the user's Virtual Garage® (e.g., Virtual Garage® 2520), the configured vehicle can be loaded into configuration engine 2510 for review and/or re-configuration.

In a similar fashion, a configured vehicle can be transferred between needs analysis module 2040 and configuration engine 2510. For example, a vehicle configured in needs analysis module 2040 (e.g., by a user navigating to one or more of web pages 1300-1800, or by some other method) can be transferred to configuration engine 2510. This allows a user to further configure a vehicle configuration, identified as desirable using needs analysis module 2040, using configuration engine 2510. The vehicle configuration, once "fine-tuned" using needs analysis module 2040, can then be stored in Virtual Garage® 2520. This process is simplified by the persistence provided by services layer 2020, which again obviates the need for a user to re-enter configuration information regarding the given vehicle.

The ability to persist a vehicle configuration can be supported by a number of features that are preferably included website architecture 2000. First, persistence is supported by the inclusion, in a given configuration of a vehicle, of all information necessary to elucidate all relevant equipment features selected by a user (regardless of the method used to indicate such selections (e.g., by comparison, configuration or by another method). This also provides support for ensuring the existence of a given configuration, which avoids a user's selection of incompatible or non-existent feature combinations, as noted earlier. Moreover, it is preferable that a Virtual Garage® such as Virtual Garage® 2520 maintain such information, to avoid the need for a user to re-enter such information upon exit from and re-entry to the website, and to simplify and speed the use of website 2500. The inclusion of all relevant information (e.g., all necessary configuration information, including all user-selectable information) also allows such configurations to easily by passed from needs analysis module 2040 to configuration engine 2510 and Virtual Garage® 2520, again obviating the need for re-entry by the user.

The configuration of database 2060 also enhances the transfer of vehicle configurations between needs analysis module 2040 and configuration engine 2510, and between needs analysis module 2040 and Virtual Garage® 2520. By providing the ability to generate a configuration list from an identifier, using configuration service 2055, website architecture 2000 allows needs analysis module 2040 to quickly and easily generate a configured vehicle. This can be done, for example, by identifying the desired vehicle configuration using some or all of the information depicted in web pages 1300-1800. Once generated, this configuration can then easily be passed to configuration engine 2510 or Virtual Garage® 2520.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A computer system to provide one or more product selections to a user in accordance with product related data provided by the user, the computer system comprising:
   a processor coupled to the memory and the database;
   a memory, coupled to the processor, storing product configuration information for multiple products, wherein the product configuration information includes product features and the memory further comprises code stored therein and executable by the processor to:
   receive the product related data from the user via a data processing system;
   identify products stored in the memory based on two different types, (A) and (B), of product identification, wherein the code to identify products based on the two different types of product identification comprises code executable by the processor to:
   (A) search for products based on product features included in the product related data, if the product related data represents the one or more product features; and
   identify one or more products stored in the memory that each include the one or more features, if the product related data represents the one or more product features; and
   (B) identify one or more products stored in the memory that are identified by a product model identifier, if the product related data represents the product model identifier; and
   provide identified products to the user for display by the data processing system of the user.

2. The computer system of claim 1 wherein the code to identify one or more products stored in the memory that are identified by a product model identifier, if the product related data represents the product model identifier further comprises code to identify one or more products stored in the memory that are identified by a product model identifier and product features, if the product related data represents the product model identifier and product features selected by the user.

3. The computer system of claim 1 wherein the memory includes a database to store the products as product configuration information and the product features comprise product attributes, wherein the product configuration information comprises product identifier information corresponding to product attribute information for the multiple product configurations and the code comprises:
   a data receiving module, stored in the memory, to receive the product related data from the user through a communication link coupled between the data processing system of the user and the data receiving module;
   a filter service module, stored in the memory, to (i) receive the one or more product attributes and (ii) identify one or more of the product configurations stored in the database that each include the one or more product attributes, if the product related data represents the one or more product attributes;
   a configuration service module, stored in the memory, to (i) receive a product identifier and to (ii) identify each combination of attributes stored in the database that corresponds to the product identifier, if the product related data represents the product identifier; and
   a presentation module, stored in the memory, to (i) provide each identified product configuration as a product selection to the user via the communication link if the product related data represents the one or more product attributes and (ii) provide one or more product selections to the user via the communication link, wherein, if the product related data represents the product identifier, each product selection represents a product identifier and a respective combination of attributes identified as corresponding to the product identifier.

4. The computer system of claim 3 wherein the data receiving module is further configured to receive data indicating a user selected product, wherein the selected product corresponds to one of the identified product configurations, and the data receiving module is further configured to receive product configuration selections from the user to further configure the selected product, the computer system further comprising:

a software configuration engine, stored in the memory, to generate configured product data corresponding to the product configuration selections associated with the selected product and in accordance with the product configuration information; and wherein the presentation module is further configured to present the configured product data to the user via the communication link.

5. The computer system of claim 3 wherein the products stored in the memory are represented by pre-generated product configurations, the system further comprising a needs analysis module, stored in the memory, to (i) process the received product related data and (ii) determine which of the service modules to provide the product related data, wherein:

said filter service module is further configured to provide a product identifier to said needs analysis module in response to one or more product attributes received from said needs analysis module, said product identifier identifies a pre-generated product configuration, and said each of the one or more product attributes is an attribute of said pre-generated product configuration.

6. The computer system of claim 5, wherein said filter service module is further configured to use said to retrieve said product identifier from said database.

7. The computer system of claim 3, wherein said database contains product identifier information that identifies each product configuration and reference data that links the one or more product attributes to a product configuration.

8. The computer system of claim 7, wherein the products stored in the memory are represented by pre-generated product configurations and said database comprises:

a configuration table storing the pre-generated product configurations; and an attribute table storing the one or more product attributes.

9. The computer system of claim 8, wherein said configuration table contains said product identifier.

10. The computer system of claim 8, wherein the product configurations are pre-generated product configurations and said attribute table comprises an attribute record comprising an attribute field containing said one or more product attributes, and an intersection field containing a reference to at least one of the pre-generated product configurations, and said configuration table comprises a configuration record comprising a configuration field containing said pre-generated product configurations and an identifier field containing said product identifier.

11. The computer system of claim 10, wherein each pre-generated product configuration describes a configuration of a product that is an allowable product configuration in accordance with product rules governing allowable combinations of product attributes, said attribute information describes an attribute of said product, and said pre-generated product configuration of said product includes said one or more product attributes.

12. The computer system of claim 10, the system further comprising a needs analysis module, stored in the memory, to (i) process the received product related data and (ii) determine which of the service modules to provide the product related data, wherein said needs analysis module is configured to access said product configuration information through said filter service.

13. The computer system of claim 10, wherein said reference allows said filter service module to access said configuration record by virtue of said filter service module being configured to access said attribute record using said one or more product attributes.

14. The computer system of claim 3, the system further comprising a needs analysis module, stored in the memory, to (i) process the received product related data and (ii) determine which of the service modules to provide the product related data, and wherein said needs analysis module is configured to permit identification of at least one of the product configurations based on the product identifier.

15. The computer system of claim 3, the system further comprising a needs analysis module, stored in the memory, to (i) process the received product related data and (ii) determine which of the service modules to provide the product related data, and wherein said configuration service module is configured to provide a configuration list to said needs analysis module in response to a product identifier received from said needs analysis module.

16. The computer system of claim 15, wherein said configuration list is a list of the available product attributes of said product.

17. The computer system of claim 15, wherein said configuration list is a list of configurations of said product.

18. The computer system of claim 15, wherein said configuration service is configured to use said product identifier to generate said configuration list from information stored in said database.

19. The computer system of claim 3, wherein said database contains product identifier information.

20. The computer system of claim 19, wherein said database comprises:

a configuration table containing said product identifier and said product configuration information.

21. The computer system of claim 20, the system further comprising a needs analysis module, stored in the memory, to (i) process the received product related data and (ii) determine which of the service modules to provide the product related data, and wherein said needs analysis module is configured to access said product configuration information through said product identifier to said configuration service module, and said configuration service module is configured to access said database by virtue of being configured to access said database using said product identifier.

22. The computer system of claim 20, wherein the product configurations are pre-generated product configurations and said configuration table comprises a configuration record comprising a configuration field containing said pre-generated product configurations, and an identifier field containing said product identifier.

23. The computer system of claim 22, wherein
said pre-generated product configurations describe a product previously configured and saved by the user, and
said product identifier identifies said configuration of said product.

24. The computer system of claim 3 wherein the product related data includes data related to a vehicle.

25. The computer system of claim 1 wherein the products stored in the memory are represented by pre-generated product configurations, the computer system further comprising:
a software configuration engine stored in the memory to generate the pre-generated product configurations.

26. A computer readable physical medium comprising product configuration information for multiple products stored in the computer readable physical medium, wherein the product configuration information includes product features and the computer readable physical medium comprises code stored therein to provide one or more product selections to a user in accordance with product related data provided by the user, wherein the code is executable by a processor to:
receive the product related data from the user via a data processing system;
identify products stored in the memory based on two different types, (A) and (B), of product identification, wherein the code to identify products based on two different types of product identification comprises code executable by the processor to:
(A) search for products based on product features included in the product related data if the product related data represents the one or more product features; and
identify one or more products stored in the memory that each include the one or more features, if the product related data represents the one or more product features; and
(B) identify one or more products stored in the memory that are identified by a product model identifier, if the product related data represents the product model identifier; and
provide identified products to the user for display by the data processing system of the user.

27. The computer readable medium of claim 26 wherein the code to identify one or more products stored in the memory that are identified by a product model identifier, if the product related data represents the product model identifier further comprises code to identify one or more products stored in the memory that are identified by a product model identifier and product features, if the product related data represents the product model identifier and product features selected by the user.

28. The computer readable medium of claim 26 wherein the product features comprise product attributes and the code is further configured to cause the processor to:
receive the product related data from the user through a communication link coupled between the data processing system of the user and the computer system;
access a database storing product configuration information, wherein the product configuration information comprises product identifier information corresponding to product attribute information for the multiple product configurations;
receive one or more product attributes and identify one or more product configurations stored in the database that each include the one or more product attributes, if the product related data represents the one or more product attributes;
receive a product identifier and identify each combination of attributes stored in the database that corresponds to the product identifier, if the product related data represents the product identifier, if the product related data represents the product identifier;
provide each identified product configuration as a product selection to the user via the communication link if the product related data represents the one or more product attributes; and
provide one or more product selections to the user via the communication link, wherein, if the product related data represents the product identifier, each product selection represents a product identifier and a respective combination of attributes identified as corresponding to the product identifier.

29. The computer program product of claim 28, wherein the code further comprises code to:
receive data indicating a user selected product, wherein the selected product corresponds to one of the product selections;
receive product configuration selections from the user to further configure the selected product;
generate configured product data corresponding to the product configuration selections associated with the selected product and in accordance with product rules stored in a memory that govern allowable combinations of the product features; and
provide the configured product data to the user via the communication link.

30. The computer program product of claim 29, wherein the products stored in the memory are represented by pre-generated product configurations and said product identifier identifies at least one of the pre-generated product configurations, and
said each of said one or more attributes is an attribute of said product.

31. The computer program product of claim 30, wherein the code further comprises code to:
use each of said one or more attributes to retrieve said product identifier from said database.

32. The computer program product of claim 29 wherein the products stored in the memory are represented by pre-generated product configurations and the computer program product further comprises a data structure, the data structure comprising information resident in said database, the information comprising:
product identifiers associated with each pre-generated product configuration and reference data that links the one or more product attributes to each pre-generated product configuration.

33. The computer program product of claim 32, wherein the products stored in the memory are represented by pre-generated product configurations and said data structure further comprises:
a configuration table storing the pre-generated product configurations, and
an attribute table to store one or more product attributes.

34. The computer program product of claim 33, wherein
said configuration table contains said product identifier said attribute table contains said one or more attributes.

35. The computer program product of claim 33, wherein the products stored in the memory are represented by pre-generated product configurations and
said attribute table comprises an attribute record comprising an attribute field containing said one or more product attributes, and an intersection field containing a reference to at least one of the pre-generated product configurations, and said configuration table comprises a configuration record comprising a configuration field containing said pre-generated product configurations, and an identifier field containing said product identifier.

36. The computer program product of claim 35, wherein each pre-generated product configuration describes a configuration of a product that is an allowable product configuration in accordance with product rules governing allowable combinations of product attributes;

said attribute information describes an attribute of said product, and said pre-generated product configuration of said product includes said one or more product attributes.

37. The computer program product of claim 35, wherein the code further comprises code to:

access said product identifier information using said attribute information.

38. The computer program product of claim 35, wherein said reference allows the code to access said configuration record by accessing said attribute record using said one or more product attributes.

39. The computer program product of claim 32, wherein said data structure further comprises:

a configuration table containing said product identifier.

40. The computer program product of claim 39, wherein said code further comprises code to:

access said product configuration information by virtue of supplying said product identifier to a configuration service, and access said database by virtue of being configured to access said database using said product identifier.

41. The computer program product of claim 39, wherein said configuration table comprises a configuration record comprising a configuration field containing said pre-generated product configurations, and an identifier field containing said product identifier.

42. The computer program product of claim 41, wherein said product configuration information describes a configuration of said product that is an allowable product configuration in accordance with product rules governing allowable combinations of product attributes, and said product identifier information identifies said pre-generated configuration of said product.

43. The computer program product of claim 28, wherein said code further comprises code to permit identification of a product configuration based on the product identifier.

44. The computer program product of claim 28, wherein the code further comprises a needs analysis module.

45. The computer program product of claim 44, wherein said code further comprises code to:

provide a configuration list to said needs analysis module in response to the product identifier received from said needs analysis module.

46. The computer program product of claim 45, wherein said configuration list is a list of the available product attributes of said product.

47. The computer program product of claim 45, wherein said configuration list is a list of configurations of said product.

48. The computer program product of claim 45, wherein said code further comprises code to:

use said product identifier to generate said configuration list from information stored in said database.

49. The computer program product of claim 28 wherein the product related data includes data related to a vehicle.

50. A method of using a computer system to provide one or more product selections to a user in accordance with product related data provided by the user, the method comprising:

receiving the product related data from the user via a data processing system;

identifying products stored in a memory based on two different types, (A) and (B), of product identification, wherein the memory stores product configuration information for multiple products, the product configuration information includes product features, and the two different types of product identification comprise:

(A) searching for products in the memory based on product features included in the product related data if the product related data represents the one or more product features; and identifying one or more products stored in the memory that each include the one or more features, if the product related data represents the one or more product features; and (B) identifying one or more products stored in the memory that are identified by a product model identifier, if the product related data represents the product model identifier; and providing identified products to the user for display by the data processing system of the user.

51. The method of claim 50 wherein identifying one or more products stored in the memory that are identified by a product model identifier, if the product related data represents the product model identifier further comprises identify one or more products stored in the memory that are identified by a product model identifier and product features, if the product related data represents the product model identifier and product features selected by the user.

52. The method of claim 50 wherein the memory includes a database to store the products as product configuration information and the product features comprise product attributes and:

receiving the product related data from the user via a data processing system comprises:

receiving the product related data from the user through a communication link coupled between the data processing system and the computer system;

receiving one or more product attributes and identifying one or more product configurations stored in the database that each include the one or more product attributes, if the product related data represents the one or more product attributes;

receiving a product identifier and identifying each combination of attributes stored in the database that corresponds to the product identifier, if the product related data represents the product identifier, if the product related data represents the product identifier;

providing each identified product configuration as a product selection to the user via the communication link if the product related data represents the one or more product attributes; and providing one or more product selections to the user via the communication link, wherein, if the product related data represents the product identifier, each product selection represents a product identifier and a respective combination of attributes identified as corresponding to the product identifier.

53. The method of claim 52, wherein the products stored in the memory are represented by pre-generated product configurations and said product identifier information identifies pre-generated product configurations, and each of said pre-generated product configuration represents a product having one or more of the attributes.

54. The method of claim 53, further comprising:

causing a needs analysis module to provide said one or more attributes to a filter service; and causing said filter service to return said product identifier to said needs analysis module.

55. The method of claim 52, wherein the products stored in the memory are represented by pre-generated product configurations, the method further comprising: querying a database of said computer system, wherein querying said database comprises:

accessing an attribute table of said database using said one or more attributes;

identifying at least one database record comprising the product identifier and said attribute information; and accessing said database record to identify a pre-generated product configuration associated with said one or more attributes.

56. The method of claim 55, wherein said product identifier is associated with said pre-generated product configurations, and each of said pre-generated product configurations represents a product having said one or more attributes.

57. The method of claim 56, wherein a configuration table comprises said pre-generated product configurations.

58. The method of claim 52 further comprising:

providing said product identifier to a configuration service;

identifying said product configuration corresponding to said product identifier by causing said configuration service to query a database using said product identifier; and causing said configuration service to return said identified product configuration.

59. The method of claim 58, wherein the products stored in the memory are represented by pre-generated product configurations and said product identifier is associated with a pre-generated product configuration in said database.

60. The method of claim 59, further comprising:

causing a needs analysis module to provide said product identifier to said configuration service; and causing said configuration service to return said pre-generated product configuration to said needs analysis module.

61. The method of claim 58, wherein the products stored in the memory are represented by pre-generated product configurations and said querying said database comprises:

accessing a configuration table of said database using said product identifier to identify said pre-generated product configuration.

62. The method of claim 61, wherein each of said pre-generated product are associated with said product identifier.

63. The method of claim 52 further comprising:

receiving data indicating a user selected product, wherein the selected product corresponds to one of the identified product configurations;

receiving product configuration selections from the user to further configure the selected product;

generating configured product data corresponding to the product configuration selections associated with the selected product and in accordance with the product configuration information; and providing the configured product data to the user via the communication link.

64. The method of claim 52, wherein said product related data includes data related to a vehicle.

65. The method of claim 64, wherein said product selections comprise a make of said vehicle.

66. The method of claim 64, wherein said product selections comprise a model of said vehicle.

67. The method of claim 64, wherein said product selections comprise a trim level of said vehicle.

68. The method of claim 64, wherein said product selections comprise an equipment level of said vehicle.

69. The method of claim 64, wherein said product selections comprise one of a price range, a vehicle type, an engine type, a fuel economy, an interior feature and a safety feature.

70. An apparatus to provide one or more product selections to a user in accordance with product related data provided by the user, the apparatus comprising:

means for receiving the product related data from the user via a data processing system;

means for identifying products stored in a memory based on two different means, (A) and (B), for product identification, wherein the memory stores product configuration information for multiple products, the product configuration information includes product features, and the two different means for product identification comprise:

(A) means for searching for products in the memory based on product features included in the product related data if the product related data represents the one or more product features; and means for identifying one or more products stored in the memory that each include the one or more features, if the product related data represents the one or more product features; and (B) means for identifying one or more products stored in the memory that are identified by a product model identifier, if the product related data represents the product model identifier; and means for providing identified products to the user for display by the data processing system of the user.

71. The apparatus of claim 70 further comprising:

means for receiving the product related data from the user through a communication link coupled between the data processing system of the user and the computer system;

means for processing the received product related data using resources of the computer system;

means for receiving one or more product attributes and identifying one or more pre-generated product configurations stored in a database that each include the one or more product attributes, if the product related data represents the one or more product attributes;

means for receiving a product identifier and identifying each combination of attributes stored in the database that corresponds to the product identifier, if the product related represents the product identifier;

means for providing each identified pre-generated product configuration as a product selection to the user via the communication link if the product related data represents the one or more product attributes; and means for providing one or more product selections to the user via the communication link, wherein, if the product related data represents the product identifier, each product selection represents a product identifier and a respective combination of attributes identified as corresponding to the product identifier.

72. The apparatus of claim 71 further comprising:
means for receiving data indicating a user selected product, wherein the selected product corresponds to one of the identified pre-generated product configurations;
means for receiving product configuration selections from the user to further configure the selected product;
means for generating configured product data corresponding to the product configuration selections associated with the selected product and in accordance with the product configuration information; and
means for providing the configured product data to the user via the communication link.

73. The apparatus of claim 71 wherein the product related data includes data related to a vehicle.

* * * * *